(12) United States Patent
Rust

(10) Patent No.: US 11,446,617 B2
(45) Date of Patent: Sep. 20, 2022

(54) EXTRUDER WITH PLANETARY ROLLER SECTION FOR COOLING MELTS

(71) Applicant: Entex Rust & Mitschke GmbH, Bochum (DE)

(72) Inventor: Harald Rust, Bochum (DE)

(73) Assignee: Entex Rust & Mitschke GmbH, Bochum (DE)

( * ) Notice: Subject to any disclaimer, the term of this patent is extended or adjusted under 35 U.S.C. 154(b) by 625 days.

(21) Appl. No.: 16/340,718

(22) PCT Filed: Mar. 26, 2018

(86) PCT No.: PCT/EP2018/000116
§ 371 (c)(1),
(2) Date: Apr. 10, 2019

(87) PCT Pub. No.: WO2018/192677
PCT Pub. Date: Oct. 25, 2018

(65) Prior Publication Data
US 2019/0263044 A1     Aug. 29, 2019

(30) Foreign Application Priority Data

Apr. 17, 2017   (DE) ..................... 10 2017 003 681.0

(51) Int. Cl.
*B01F 27/232*      (2022.01)
*B29C 48/255*     (2019.01)
(Continued)

(52) U.S. Cl.
CPC .......... *B01F 27/2324* (2022.01); *B29B 7/422* (2013.01); *B29B 7/427* (2013.01);
(Continued)

(58) Field of Classification Search
CPC ..... B01F 7/00991; B29B 7/422; B29B 7/486; B29B 7/427; B29B 7/46; B29B 7/487;
(Continued)

(56) References Cited

U.S. PATENT DOCUMENTS 3,310,837 A * 3/1967 Wittrock ................. B29C 45/50
366/76.1
4,889,430 A * 12/1989 Mueller ................ B29C 48/425
366/85

(Continued)

FOREIGN PATENT DOCUMENTS

CA        698518 A      11/1964
DE        433487        9/1926
(Continued)

*Primary Examiner* — Charles Cooley
(74) *Attorney, Agent, or Firm* — Smartpat PLC

(57) ABSTRACT

Various measures increase the cooling effect on a planetary roller extruder section/module. Those measures include a choke being arranged at an outlet of the planetary roller extruder section or module, a distance between centerlines of adjacent planetary spindles being at least equal to an outer diameter of the planetary spindles, providing a pressurized melt supply, having a cooling section composed of several sections/modules, providing at least one section/module in which a flow, during melt supply is converse to the conveying direction of the extruder, and providing cooling tubes arranged within the central spindle.

24 Claims, 9 Drawing Sheets

(51) Int. Cl.
| | |
|---|---|
| *B29C 48/25* | (2019.01) |
| *B29C 48/455* | (2019.01) |
| *B29C 48/375* | (2019.01) |
| *B29C 48/425* | (2019.01) |
| *B29C 48/435* | (2019.01) |
| *B29C 48/505* | (2019.01) |
| *B29C 48/85* | (2019.01) |
| *B29B 7/48* | (2006.01) |
| *B29B 7/82* | (2006.01) |
| *B29B 7/72* | (2006.01) |
| *B29C 48/515* | (2019.01) |
| *B29C 48/44* | (2019.01) |
| *B29C 48/365* | (2019.01) |
| *B29B 7/42* | (2006.01) |
| *B29B 7/46* | (2006.01) |
| *B29C 48/39* | (2019.01) |
| *B29C 48/29* | (2019.01) |
| *B29C 48/84* | (2019.01) |
| *B29C 48/285* | (2019.01) |

(52) U.S. Cl.
CPC ............... *B29B 7/46* (2013.01); *B29B 7/485* (2013.01); *B29B 7/486* (2013.01); *B29B 7/487* (2013.01); *B29B 7/726* (2013.01); *B29B 7/823* (2013.01); *B29B 7/826* (2013.01); *B29C 48/255* (2019.02); *B29C 48/2561* (2019.02); *B29C 48/2565* (2019.02); *B29C 48/365* (2019.02); *B29C 48/387* (2019.02); *B29C 48/425* (2019.02); *B29C 48/435* (2019.02); *B29C 48/44* (2019.02); *B29C 48/455* (2019.02); *B29C 48/507* (2019.02); *B29C 48/515* (2019.02); *B29C 48/85* (2019.02); *B29C 48/285* (2019.02); *B29C 48/29* (2019.02); *B29C 48/39* (2019.02); *B29C 48/84* (2019.02)

(58) Field of Classification Search
CPC ......... B29B 7/823; B29B 7/726; B29B 7/826; B29B 7/485; B29C 48/515; B29C 48/44; B29C 48/365; B29C 48/255; B29C 48/2565; B29C 48/455; B29C 48/387; B29C 48/507; B29C 48/85; B29C 48/84; B29C 48/285; B29C 48/425; B29C 48/435; B29C 48/2561; B29C 48/39; B29C 48/29; B29C 48/43
See application file for complete search history.

(56) References Cited

U.S. PATENT DOCUMENTS

| | | | |
|---|---|---|---|
| 5,967,919 A | 10/1999 | Bakker | |
| 6,056,229 A | 5/2000 | Blume et al. | |
| 6,074,084 A * | 6/2000 | Kolossow | B29B 7/487 366/84 |
| 6,150,017 A | 11/2000 | Burmeister et al. | |
| 6,780,271 B1 | 8/2004 | Burmeister et al. | |
| 6,977,239 B1 | 12/2005 | Weuthen et al. | |
| 7,049,279 B1 | 5/2006 | Weuthen et al. | |
| 7,476,416 B2 | 1/2009 | Tynan et al. | |
| 11,141,903 B2 * | 10/2021 | Gneuss | B29C 48/425 |
| 2003/0012077 A1 * | 1/2003 | Behling | B29B 7/845 366/85 |
| 2003/0015814 A1 | 1/2003 | Krull et al. | |
| 2003/0022809 A1 | 1/2003 | Weuthen et al. | |
| 2003/0027741 A1 | 2/2003 | Weuthen et al. | |
| 2003/0144172 A1 | 7/2003 | Weuthen et al. | |
| 2005/0272839 A1 | 12/2005 | Bauer et al. | |
| 2006/0029760 A1 | 2/2006 | Kreft et al. | |
| 2006/0052472 A1 | 3/2006 | Hansen et al. | |
| 2006/0079709 A1 | 4/2006 | Gurtler et al. | |
| 2006/0084734 A1 | 4/2006 | Bauer et al. | |
| 2007/0055032 A1 | 3/2007 | Langenbuch et al. | |
| 2007/0161746 A1 | 7/2007 | Weber | |
| 2007/0173622 A1 | 7/2007 | Tynan et al. | |
| 2008/0118751 A1 | 5/2008 | Zollner et al. | |
| 2008/0269415 A1 | 10/2008 | Spyrou et al. | |
| 2009/0234194 A1 | 9/2009 | Bhatt | |
| 2009/0236766 A1 * | 9/2009 | Rust | B29C 48/435 264/141 |
| 2013/0023639 A1 | 1/2013 | Rust | |
| 2015/0043300 A1 | 2/2015 | Rust | |
| 2015/0118352 A1 * | 4/2015 | Visscher | B29B 7/485 426/3 |
| 2015/0283728 A1 * | 10/2015 | Rust | B29B 7/489 366/81 |
| 2016/0243744 A1 | 8/2016 | Gneuss et al. | |
| 2018/0126623 A1 | 5/2018 | Rust | |
| 2018/0251624 A1 | 9/2018 | Rust | |
| 2018/0281263 A1 | 10/2018 | Rust | |
| 2019/0263044 A1 * | 8/2019 | Rust | B29B 7/422 |
| 2019/0329450 A1 * | 10/2019 | Rust | B29C 48/288 |
| 2020/0001502 A1 * | 1/2020 | Rust | B29B 7/7495 |

FOREIGN PATENT DOCUMENTS

| | | | |
|---|---|---|---|
| DE | 1954214 A1 | 5/1971 | |
| DE | 3908415 A1 | 9/1990 | |
| DE | 19548136 A1 | 6/1997 | |
| DE | 19638094 A1 | 3/1998 | |
| DE | 19939075 A1 | 2/2001 | |
| DE | 19939077 A1 | 2/2001 | |
| DE | 19953793 A1 | 5/2001 | |
| DE | 19953796 A1 | 5/2001 | |
| DE | 19956802 A1 | 6/2001 | |
| DE | 19956803 A1 | 6/2001 | |
| DE | 19958398 A1 | 6/2001 | |
| DE | 19960494 A1 | 6/2001 | |
| DE | 19962859 A1 | 7/2001 | |
| DE | 19962883 A1 | 7/2001 | |
| DE | 19962886 A1 | 7/2001 | |
| DE | 29724783 U1 | 1/2004 | |
| DE | 10354172 A1 | 6/2005 | |
| DE | 10356423 A1 | 6/2005 | |
| DE | 102004048440 A1 | 6/2005 | |
| DE | 102004048794 A1 | 6/2005 | |
| DE | 102004002159 A1 | 8/2005 | |
| DE | 102004004230 A1 | 8/2005 | |
| DE | 102005007952 A1 | 9/2005 | |
| DE | 102004023085 A1 | 12/2005 | |
| DE | 102004026799 A1 | 12/2005 | |
| DE | 102004032694 A1 | 2/2006 | |
| DE | 102004038774 A1 | 2/2006 | |
| DE | 102004038775 A1 | 3/2006 | |
| DE | 102004044085 A1 | 3/2006 | |
| DE | 102004044086 A1 | 3/2006 | |
| DE | 102004046228 A1 | 3/2006 | |
| DE | 102004048773 A1 | 4/2006 | |
| DE | 102004048875 A1 | 4/2006 | |
| DE | 102004061068 A1 | 7/2006 | |
| DE | 19653790 | 9/2006 | |
| DE | 102006001171 A1 | 4/2007 | |
| DE | 102006033089 A1 | 10/2007 | |
| DE | 10054854 | 1/2008 | |
| DE | 102004034039 B4 | 4/2008 | |
| DE | 102007050466 A1 | 4/2009 | |
| DE | 102008018686 A1 | 10/2009 | |
| DE | 102009059912 A1 | 6/2011 | |
| DE | 102010026535 A1 | 1/2012 | |
| DE | 102012006169 A1 | 10/2013 | |
| DE | 102013000708 A1 | 4/2014 | |
| DE | 202016101935 U1 | 4/2016 | |
| DE | 102017003681 A1 * | 10/2018 | B29C 48/85 |
| EP | 0854178 A1 | 7/1998 | |
| EP | 1056584 A1 | 12/2000 | |
| EP | 1078968 A1 | 2/2001 | |
| EP | 1006066 A3 | 5/2001 | |
| EP | 1067352 B1 | 8/2003 | |
| EP | 1844917 A2 | 10/2007 | |

(56) References Cited

FOREIGN PATENT DOCUMENTS

| | | |
|---|---|---|
| EP | 2289687 A1 | 3/2011 |
| EP | 1533101 B2 | 12/2011 |
| EP | 2335898 A3 | 11/2013 |
| JP | H09326731 A | 12/1997 |
| JP | H10235713 A | 9/1998 |
| JP | H1180690 A | 3/1999 |
| JP | H11216754 A | 8/1999 |
| JP | H11216764 A | 8/1999 |
| WO | 9411175 A1 | 5/1994 |
| WO | 9942276 A1 | 8/1999 |
| WO | 2004037941 A2 | 5/2004 |
| WO | 2004101626 A1 | 11/2004 |
| WO | 2004101627 A1 | 11/2004 |
| WO | 2007087465 A2 | 8/2007 |
| WO | 2008058609 A2 | 5/2008 |
| WO | 2011091966 A1 | 8/2011 |
| WO | 2013159801 A1 | 10/2013 |
| WO | 2014056553 A1 | 4/2014 |
| WO | 2017001048 A1 | 1/2017 |
| WO | 2017028936 A1 | 2/2017 |
| WO | 2017050400 A1 | 3/2017 |
| WO | 2018188716 A1 | 10/2018 |

\* cited by examiner

EXTRUDER WITH PLANETARY ROLLER SECTION FOR COOLING MELTS

TECHNICAL FIELD

The disclosure relates to measures for increasing the cooling effect on a planetary roller extruder section/module.

BACKGROUND

Extruders are often used for processing materials, in particular plastics, which are at least partially in a molten state or can be brought into a molten state. These materials are often polymers, copolymers and elastomers. In the extruder, materials of all kinds can be processed, including solids with molten materials, including polymer blends, and copolymer blends, even elastomers, also in blends with other additional substances The substances can be for example: Acrylonitrile (ABAK), acrylonitrile/butadiene/styrol (ABS), ABS with polycarbonate (ABS+PC), acrylate-caoutchouc (ACM), ethylene-acrylic ester-caoutchouc (AEPCMS), acrylonitrile/ethylene-propylene-diene/styrol (AES), nitroso-caoutchouc (AFMU), acrylonitrile methacrylate (AMAK), acrylonitrile/methyl methacrylate (AMMA), acrylonitrile/butadiene/acrylate (ANBA), acrylonitrile/methacrylate (ANMA), aromatic polyester (APE), acrylonitrile/chlorinated polyethylene/styrol (APE-CS), acrylonitrile/styrol/acrylic ester (ASA), TPE, basis aliphatic polyurethane (ATPU), urethane-caoutchouc, polyester (AU), benzyl cellulose (BC), butadiene caoutchouc (BR), cellulose acetate (CA), cellulose acetate butyrate (CAB), cellulose acetopropinate (CAP), kresol-formaldehyde (CF), hydrated cellulose, cellulose film (CSH), chlorinated PE-caoutchouc (CM), carboxymethyl cellulose (CMC), cellulose nitrate, celluloid (CN), epichlorhydrin caoutchouc (CO), cyclopolyolefin polymer, topaz (COC), cellulose propionate (CPL), chloroprene caoutchouc (CR), casein plastics (CS), casein formaldehyde, galalith (CSF), chlorsulfonated PE(-caoutchouc) (CSM), cellulose triacetate (ICTA), dicyclopentadiene (DCP), ethylene/methacrylic acid (EAA), ethylene vinyl acetate caoutchouc (EAM), ethylene/butyl acrylate (EBA), ethyl cellulose (EC), ethylene copolymer-bitumen-blend (ECB), epichlorhydrin caoutchouc (ECD), ethylene/chlorine trifluor ethylene (ECTFE), ethylene/ethyl acrylate (EEA), polyethylene ionomer (EIM), ethylene/methacrylic acid (EMAK), exo-methylenelacton (EML), ethyl idennorbornen (EN), ethylene-acrylonitrile-caoutchouc (ENM), epoxidized natural caoutchouc (ENR), ethylene/propylene (EP), epoxy resins, polyaddition resins (EP), ethylene/propylene/(diene)/-caoutchoucs (EP(D)M), epichlorhydrin caoutchouc (ETER), ethylene/tetrafluorethylene (ETFE), urethane caoutchouc, polyether (EU), ethylene/vinyl acetate (EVA), ethylene/vinyl alcohol, EVOH (EVAL), TPE, basis ethylne/vinyl acetate+polyvinylidene chloride (EVAPVDC), ethylene/vinyl alcohol, EVAL (EVOH), tetrafluorethylene/hexafluorpropylene (FEP), furan/formaldehyde (FF), perfluor caoutchouc (FFKM), fluor caoutchouc (FKM), propylene/tetrafluorethylene caoutchouc (FPM), phaspazen caoutchouc with fluoralkyl or fluoralkyl groups (FZ), propylene oxide caoutchouc (GPO), halogenated butyl caoutchouc (HIIR), hydrogenated NBR-caoutchouc (HNBR), higher alpha-olefins (HOA), pyrone, plycyclone, ladder polymers (HAT-P), polyclone ladder polymere (HT-PP), polytriazine, ladder polymers (HAT-PT), butyl caoutchouc (CIIR, BIIR) (IIR), isoprene caoutchouc (IR), hydrocarbon resin (KWH), liquid christal polymers (LCP), methylmethacrylate/acrylonitrile/butadiene/styrol (MABS), methacrylate/butadiene/styrol (MBS), methyl cellulose (MC), melamine/formaldehyde (MF), melamine/formaldehyde+unsaturated polyester (MF+UP), melamine/phenol-formaldehyde (MPF), methyl/phenyl/silicone-caoutchouc (MPQ), methyl methacrylate/exo-methylenelacton (MMAEML), melamine/phenol-formaldehyde (MPF), methyl/silicone-caoutchouc (MQ), alpha-methylstyrol (MS), melamine/urea/-formaldehyde (MUF), elamine/urea/phenol/formaldehyde (MVFQ), polyacrylnitrile (PAN), polybutene-I (PB), polybutyl acrylate (PBA), polybenzimidazole, triazine polymer (PBI), polybismaleinimide (PBMI), polybutylene naphthalate (PBN), polyoxadiabenzimidazole (PBO), polybutylenterephthalate (PBT), polycarbonate (PC) with ABS or AES, ASA or PBT or PE-HD or PEET or PMMA or PS or PPE or SB or HI or SMA or TPU or BPA or TMBPA or TMC, poly-3,3-bis-chlorine methyl propylene oxide (PCPO), polycyclohexane dimethylterephthalate (PCT), polychlorotrifluorethylene (PCTFE), polydiallyl phthalate (PDAP), polydicyclopentadiene (PDCPD), polyethylene (PE), polyester amide (PEA), polyester carbonate (PEC), polyether ketone (PEK), polyethylene naphthalate (PEN), polyethylene oxide (PEOX), polyether sulfone (PES), Polyester imide (PESI), polyethylene terephthalate (PET) with elastomer or with MBS or PBT or PMMA or Pmma or PSU, phenol/formaldehyde (PF), phenol/formaldehyde+epoxide (PF+EP), PTFE/perfluor alcyl vinyl ether, perfluoroalkoxy (PFA), phenol/formaldehyde/melamine (PFMF), polyperfluor trimethyl triazine-caoutchouc (PFMT), PTFE-co-polymerisate (PFTEAF), polyhydroxyl alkaline (PHA), polyhydroxy benzoate (PHBA), polyimidimid (PI), polyisobutylene (PIB), polyimide sulfone (PISO), aliphatic polyketone (PK), poly lactide (PLA), poly methyl acrylate (PMA), polymethacryl imide (PMI), poly methyl methacrylate (PMMA), polyacrylic ester imide (PMMI), poly-4-methyl pentene-1 (PMP), poly-alpha-methyl styrol (PMS), fluor/phosphazene-caoutchouc (PNF), polynorbornes-caoutchouc (PNR), polyolefins, polyolefin derivatives and polyolefin co-polymerisate (PO), poly-p-hydroxy-benzoate (POB), polyoxymethylene (poly acetal resin, poly-formaldehyde) (POM), POM with PUR-elastomer or homopolymer or co-polymer, poly phthalate (PP), PP-carbonate, PP with block polymers or chlorinated or with homopolymer or with metallocene produced, polyamide (PPA), polyphenylene ether (PPE), PPE with PA or with PBT or with PS, polydphenyloxidpyrronellithimid U (PPI), polyparamethyl styrol (PPMS), polyphenylene oxide (PPO), polypropylene oxide (PPDX), poly-p-phenylene (PPP), polyphenylene sulfide (PPS), polyphenylene sulfone (PPSU), poly-m-phenylene/terephthalamide (PPTA), polyphenyl vinyl (PPV), polypyrrole (PPY), polystyrene (PS), PS with PC or PE or PPE, polysaccharide (PSAC), polysulfone (PSU), polytetrafluoroethylene (PTFE), polytetrahydrofuran (PTHF), polybutylene phthalate (PTMT), polytrimethylene phthalate (PTT), polyester (PTP), polyurethane (PUR), polyvinyl acetate (PVAC), polyvinyl alcohol (PVAL), polyvinyl butyral (PVB), polyvinyl isobutyl ether (PVBE), polyvinyl chloride (PVC), polyvinylidene chloride (PVDC), polyvinyl fluoride (PVDF), polyvinyl fluoride (PVF), polyvinyl formal (PVFM), polyvinyl carbazole (PVK), polyvinyl methyl ether (PVME), polyvinyl cyclohexane (PVZH), phosphazene/caoutchouc with phenol groups (PZ), esorcin/formaldehyde (RF), styrol/acrylonitrile (SAN), styrol/butadiene (SB), styrol/butadiene/methyl methacrylate (SBMMA), styrol/butadiene caoutchouc (SBR), styrol/butadiene/Styrol (SBS), styrol ethenbutene/styrol (SEBS), styrol/ethylene/propylene/diene-caoutchouc (SEPDM), silicone (SI), styrol/isoprene/maleic anhydride (SIMA), isoprene/styrol-caoutchouc (SIR), styrol/isoprene/styrol (SIS), styrol/maleic anhydride (SAM), styrol/maleic anhydride/butadiene (SMAB), styrol/methyl methacrylate (SMMA), styrol/alpha-methyl styrol (SMS), polyester (SP), thiocarbonyl difluoride-copolymer-caoutchouc (TCF), TPE with EPDM+PP or PBBS+PP, TPE with PEBBS+PPE or PEBS+PP or with PESST or PESTRUR or with PESTEST or with PESTUR or with PEUR or with SBS+PP, thermoplastic elastomers (TPE), thermoplastic starch (TPS), urea/formaldehyde (UF), vinyl chloride (VC), vinyl chloride/ethylene (VCE), vinyl chloride/maleic anhydride (VCMA), vinyl ester (VE).

These substances can also occur in mixtures with each other and with other substances. Or there are derivatives of above substances alone or in mixtures with other substances.

The chosen substances can also
intensify effects,
develop additional effects, for example increase the heat resistance or the wear resistance or increase the acid resistance or UV stability or increase the consistency or the resilience or cause a crosslinking of the molecules or cause a reaction of the polymers or cause a discoloration of the polymers or increase the colour consistency of the polymers or alter the melting point or facilitate the dispersion and homogenization or cause a foam generation or facilitate foam generation or facilitate extruding or alter the friction coefficient, or
be fillers.

The extruder can perform various tasks during extrusion. The tasks include, for example
the blend with other substances and/or
the reaction with other substances and/or
the forming of the substances.

In addition to the polymers, various other materials are used for the extrusion. These include fillers, dyestuffs, softeners, stabilizers and other additives and auxiliary materials. All substances are referred to below as raw material. The raw material can appear in solid or in liquid form.

Generally, solid matters are liquefied by mechanical deformation and heating. Solids can also be brought together with liquids. It is also possible to mix liquids and/or solid matters with each other. Even solid particles can be processed in the extruder.

The raw material is preferably added to the feed part in a section intended for this purpose. This is followed by the processing of the raw material under mechanical deformation. The raw material is heated by the deformation. As a rule, a certain temperature in the extruder must be observed. In order that the desired temperature can be reached quickly, the extruder can be heated at the point in question. The unwanted heat generated during the deformation is dissipated by cooling.

For heating and cooling it is known to flow through the housing of the extruders with heating agents or coolants. Depending on the design, the extruders have different cooling properties/heating properties.

Extruders are divided into the following main groups: single-screw extruder, twin-screw extruder, and planetary roller extruder.

Single-screw extrudes consist of a rotating screw and a surrounding housing. With single-screws a high pressure build-up and a high conveying effect can be reached. However, homogenization and dispersion in the single-screw extruder is low. Nevertheless, single-screw extruders are still the most used extruders.

Twin-screw extruders consist of two parallel to one another and together intermeshing screws and a surrounding housing. Also with twin-screw extruders a high pressure build-up and a high conveying effect can be achieved. The mixing effect of the twin-screw extruder is much greater than with a single-screw extruder, but due to the mechanical load in the twin-screw extruder, polymers experience a more or less great change of their molecular chains. There are applications that can handle this.

For other applications, the preservation of molecular chains is important. A planetary roller extruder lends itself to those applications.

Planetary roller extruders consist of more parts, namely a rotating central spindle, a housing surrounding the central spindle in a distance with an internal toothing and planetary spindles which rotate in the void between the central spindle and the internally toothed housing like planets around the central spindle. In the following, reference to an internal toothing of the housing includes a multipart housing with a liner in the housing which forms the internal toothing of the housing. In the planetary roller extruder, the planetary spindles are intermeshing with both the central spindle and the internally toothed housing. At the same time, the planetary spindles slide with the end pointing in conveying direction on a stop ring.

The planetary roller extruders have an extremely good mixing effect compared to all other extruder types, but a lower conveying effect.

Planetary roller extruders are described in particular in the following publications: DE202016101935, DE19939075A1, CA698518, DE19653790A, DE19638094A1, DE19548136A1, DE1954214A, DE3908415A, DE19939077A, EP1078968A1, EP1067352A, EP854178A1, JP3017176, JP11080690, JP9326731, JP11-216754, JP11-216764, JP10-235713, WO2007/0874465A2, WO2004/101627A1, WO2004/101626A1, WO2004/037941A2, EP1056584, PCT/EP99/00968, WO 94/11175, U.S. Pat. No. 6,780,271B1, U.S. Pat. No. 7,476,416.

Reference is made to planetary roller extruder sections/modules when an extruder is composed of several sections/modules. Reference to a "section" implies a length which is adapted to the respective processing line in the extruder. Reference to a "module", however, indicates uniform lengths.

In most cases, different processing steps take place in the sections/modules. For years it has proven to be favorable to combine planetary roller extruder sections/modules with sections/modules of a different design. In particular, planetary roller extruder sections/modules are combined with a feed section designed as a single-screw extruder section/module.

Via the feed part the raw material for the extrusion is removed from a feed hopper and pressed into the downstream planetary roller extruder sections/modules in order to be processed there.

As far as liquid blowing agents or other liquid substances are to be fed into the planetary roller extruder sections/modules, it has been proven to inject these liquids via injection rings into the system, which are arranged between each two planetary roller extruder sections/modules.

It is also known to feed melt via a side arm extruder or a pump directly into a planetary roller extruder section/module.

For details and variation of known planetary roller extruders or sections/modules, reference is made to the following publications: DE102005007952A1, DE102004061068A1, DE102004048875A1, DE102004048794A1, DE102004048773A1, DE102004048440A1, DE102004046228A1, DE102004044086A1, DE102004044085A1, DE102004038774A1, DE102004034039A1, DE102004032694A1, DE102004026799B4, DE102004023085A1, DE102004004230A1, DE102004002159A1, DE19962886A1, DE19962883A1, DE19962859A1, DE19960494A1, DE19958398A1, DE19956803A1, DE19956802A1, DE19953796A1, DE19953793A1.

In the case of the extruders, for example, the feed zone, the melting zone, the mixing zone/dispersing zone/homogenizing zone and the discharge zone can occur. The discharge zone may comprise: cooling and discharging. However, cooling and discharging can also be considered as separate zones. There are also other zones.

When discharging the melt, in many cases dies are used, with which the discharging melt is to be brought into a specific form. The melt keeps the desired shape after the discharge out of the die only when it has a certain stability immediately after discharge out of the die, which increases with advancing cooling of the melt. This desired shape stability is temperature-dependent. At a higher processing temperature of the melt in the extruder, a cooling of the melt is required until it leaves the die.

Cooling prior to the discharge of the melt from the extruder may also be required for reasons other than shaping. For example, when for a processing in a downstream facility a lower temperature is required.

SUMMARY

The invention has set itself the task to improve especially the cooling before the discharge out of the extruder technically and economically. This is achieved with the features of the main claim. The dependent claims describe preferred embodiments.

The invention has recognized that the cooling in the extruder depends on its design. Planetary roller extruders show a better cooling effect than single-screw extruders and twin-screw extruders. This is due to the fact that in the planetary roller extruder the melt is brought into contact with the cooling surface much more frequently than in other extruder types, then pushed off the cooling surfaces again, mixed and brought into contact again with the cooling surfaces.

According to the invention, cooling modules/sections are therefore scheduled in a planetary roller extruder design where a cooling is required to substantially reduce the melt temperature. This applies, for example, before the discharge of the melt out of the extruder.

At modern extruders one extruder section/module is allocated mostly to every zone. Each housing is provided with a flange at each end, so that each housing can be connected to with its adjacent housing by means of a flange. Only the housing belonging to the discharge of the extruder has only at one end a flange, namely that end which faces the other housings. The housings attached to each other usually surround screws or central spindles extending through all the modules.

This means, the single-screw extruder composed of sections/modules has one single screw extending through all the sections/modules.

The planetary roller extruders have a central spindle which extends through all modules. At least the planetary spindles rotating around the central spindle and the internal toothing of the housing belong to the planetary roller extruder section/module. The planetary spindles slide with the end facing the extruder discharge (in extrusion direction rear end) on a stop ring, which is held in the housing. Normally, the length of the planetary spindles is limited to the respective section/module.

According to the invention, a cooling module/section in planetary roller extruder design has a housing which is adapted in its dimensions to the housing of other modules/sections that belong to the extrusion line. The other modules/sections can have a single-screw design or as well a planetary roller extruder design. At these types of construction, all modules/sections can be connected in alignment with each other at the housings and penetrated by a common screw/central spindle. Optionally, the cooling planetary roller extruder module/section can also be part of the secondary extruder of a tandem system. Likewise, the cooling planetary roller extruder module/section may also be part of a cascade system. The combination with other modules/sections in twin-screw extruder design is preferably carried out in a tandem system.

The cooling capacity of the cooling extruder according to the invention will be increased by one or more of the following characteristics:
- a filling level of preferably larger than 95%, more preferably larger than 98% of the void volume of the extruder
- a choke at the outlet of the cooling extruder
- melt entry under pressure greater than the conveying pressure of the planetary roller extruder parts
- a melt pump for the melt entry, where necessary with upstream single-screw part for melt entry, or
- side-arm extruder at the entry of the cooling extruder
- minimized entry of mechanical energy into the melt during the throughput through the cooling extruder
- distance between the planetary spindles greater than their outer diameter
- reduced speed of the central spindle
- reduced toothing by nap toothing or toothing of transport spindles or by the toothing of transversal mixing planetary spindles at the planetary spindles
- greater cooling section Usually, planetary roller extruders are operated in operational state with all planetary spindles and other parts with a filling level of less than 90%, preferably less than 80% of their void volume. Preferably, the module/section intended for the cooling according to the invention is operated with a filling/filling level of 100% of the void volume. If this fails, a filling/filling level of more than 98% is envisaged; where this does not work, with a filling/filling level greater than 95%.

The filling/filling level according to the invention is achieved with a throttling of the melt flow at the outlet. In the simplest case, a correspondingly small selected die cross-section is sufficient to achieve the desired throttling.

The die cross-section can also be changed, for example by exchangeable rings with different opening cross-sections. This is regularly connected with a modification measure. An adjustable throttle can also be achieved by a throttle valve in the flow direction in front of the die. The throttle valve can be kept fully or widely closed during start-up of the line until a desired degree of filling was formed in the module/section (in planetary roller extruder design). Then it is easier to achieve a stable operation with the desired filling/filling level of the module/section within short. The same effect as with a throttle valve can be achieved with a speed-controllable melt pump between the cooling module/section and the outlet die.

On the inlet side, the desired filling/filling level can be achieved by a module/section designed as s single-screw. The single screw can be relatively short, for example, a length of 1 to 2 D may suffice, at which D is the external diameter of the screw. In addition, the single-screw can be in the above-described form part of the central spindle, which then extends as a single-screw through the extruder part, which is upstream of the cooling module/section.

On the inlet side, the melt can also be fed into the cooling module/section through a side-arm extruder. The side-arm extruder preferably has the form of a twin-screw extruder. In this case, the melt entry can take place crosswise to the housing of the center axis and through the housing of the cooling module/cooling section. The side-arm extruder then has its own drive. Preferably, the drive is adjustable, so that the melt supply can be increased or reduced as needed.

Side-arm extruders are described, for example, in the following publications: WO2008/058609, WO2013/159801, WO2014/056553, WO2017/001048, WO2017/028936, DE10054854, DE10356423, DE102006001171, DE102008018686.

Instead of the side-arm extruder, also melt pumps can be used for the melt entry into the cooling module/section.

At a cooling module/section according to the invention it is advantageous to supply as little mechanical energy as possible during the throughput through the cooling extruder into the melt. The supplied energy would have to be dissipated again by the cooling together with the surplus energy from the previous melt compounding. The energy input required for the movement of the central spindle and the rotating planetary spindles can be reduced by increasing the distance of the planetary spindles on their orbit. While the distance between the planetary spindles during normal melt processing, for example in plastics processing, is usually considerably less than half the outer diameter of the planetary spindle, is according to the invention for the operation of a cooling module/section according to the invention a distance between two adjacent planetary spindles on their orbit around the central spindle intended, which is at least equal to the outer diameter of the planetary spindles. Even more preferred is the distance of at least 1.5 times of the outer diameter of the planetary spindle.

The large distance between the planetary spindles results in a significant reduction of the number of planetary spindles. However, the inventions also takes into account that with the reduced number of planetary spindles a reduced material exchange on the cooling surfaces of the planetary roller extruder section/module is involved. Preferably, the distance between the planetary spindles is therefore not greater than twice the outer diameter of the planetary spindle.

According to the invention, the cooling is metered in such a way that the melt in the deepest depth between the teeth of the internal toothing in the housing/liner does not solidify in such a way that it blocks the moving parts. With increasing cooling, the melt the melt becomes normally more viscous. The motor has to supply a much more power to maintain the requested speed. This is reflected in a larger current consumption of the motor. Therefore, the cooling can be controlled by the current consumption of the drive motor for the cooling module/section. This prevents a blocking of the moving parts.

If the desired reduction of the melt temperature is not achieved by means of the above control/adjustment, the cooling section is extended according to the invention and/or the dwell time of the melt in the cooling is extended by other means.

The extension of the cooling section is made by extension of the extruder. In the case of a modular cooling extruder, the extension can also be carried out by attaching a further cooling module.

For this purpose, another housing is attached to the existing housing of a cooling module in such a way that overlong planetary spindles can extend through both housings or even more housings. In this case, the liners of the module can be aligned with their toothing in such a way that an overlong planetary spindle can simultaneously intermesh with the internal toothing of one liner and with the internal toothing of the other liner.

According to the invention is then preferably used that the internal toothing of the liners has a whole number of teeth (on the inner surface of the liner are circumferentially arranged whole teeth side by side, which run parallel to each other from one end of the liner to the other end of the liner). In order to produce a perfect contact of the planetary spindle with the internal toothing of the neighboring liners, the liners are brought to a certain distance, in which the planetary spindles simultaneously mesh in the toothing of the two liners. Starting from an always identical position of the liners in the module housings, the distance from the pitch of the teeth and their dimension can be calculated.

The distance can be determined empirically, by, for example,
- first mounting the central spindle on the extruder drive,
- then mounting the first housing of the intended planetary roller extruder modules in extrusion direction,
- then pushing the next (second) housing in extrusion direction over the central spindle,
- then pushing a planetary spindle (better several planetary spindles, evenly distributed around the central spindle) between the central spindle and the second housing until the planetary spindle adjoins the liner of the second housing,
- then changing the distance of the housings by turning the planetary spindle until the planetary spindle engages with one tooth into the toothing of the liner of the first housing. The resulting distance of the liners can be used for the fabrication of an intermediate piece, by which the gap between the both spaced liners in axial direction is closed completely in the axial direction and at least partially in the radial direction. The distance between the liners determines the axial length of an intermediate piece between the two housings. The intermediate piece can surround the rotating planetary spindles without toothing. However, the intermediate piece can be internally toothed like the liners and bridge the gap between the two liners in such a way that a toothing length is created as at a one-piece liner, on which the two housings described above are shrunk,
- then securing the adjacent housings to each other at the flanges so that the intermediate piece is clamped between the neighboring ends of the housing.

An intermediate piece determined for a construction size can also be used in that version for same other planetary roller extruder modules.

It may also be appropriate to shrink two module housings on an overlong liner. This can be done with intermediate piece or without intermediate piece. The intermediate piece would then preferably have the task of protecting the liners in the gap between the shrunk-on housings from bending loads and other loads.

Optionally, an extruder section adapted to a previously desired cooling section may be combined with a cooling module for extension. Then the extruder section to be extended is treated as an extruder-module.

The above described extended cooling extruder section/module also requires an extended central spindle. The extended central spindle can include a special construction. It is also possible to extend the previous central spindle, when the central spindle on its part is composed of sections. The sections are the preferably composed of sleeves, which are clamped together with a tension rod. In doing so, the torque need not only be transmitted by the friction between the sleeves alone. The sleeves may have additionally a positive locking by being provided at one end with a threaded pin and at the other end with a threaded hole, so that the sleeves with the pin can be screwed into the threaded hole of the other sleeves.

A further way to extend the dwell time provides that the melt in the cooling extruder/section/module will be correspondingly long circulated and that thereby only a corresponding small part of the melt is fed or discharged.

The circulation can be effected by a correspondingly high volume of the void by the central spindle and the rotating planetary spindles by controlling the melt entry and the melt discharge. The discharge can be controlled well by means of a valve.

The circulation can take place with the usual degree of filling of the planetary roller extruder. However, it is preferable to work with a filling degree as high as possible. The higher the filling degree, the greater the amount of melt in the extruder.

For the supply is a pump, in particular a controllable pump of advantage. Thereby, the pump can be fed with melt by an extruder, preferably a single-screw extruder.

In order to reduce the conveying effect of the planetary roller extruder, it is also possible to use in the cooling module according to the invention planetary spindles, which are wholly or partially designed as nap spindles or as transport spindles. By such spindles, less mechanical energy is introduced into the melt, which must be dissipated again by means of the cooling.

In the design as nap spindles the planetary spindles differ from planetary spindles in that way, that after cutting the usual normal toothing additionally counter-rotating teeth are cut into the planetary spindles, which cross the previously cut teeth. As a result, naps remain as tooth trimming. The nap toothing is described in WO2014/056553, WO2011/091966, WO2017/001048.

The transport spindles differ from planetary spindles in normal toothing in that way that after cutting the usual normal toothing individual teeth are wholly or partially cut out of the planetary spindles. Thereby, the number of teeth of a planetary spindly can be reduced to three teeth or even one tooth. As long as several teeth of the tooth trimming remain on a nap spindle, the teeth are preferably evenly distributed on the circumference of the nap spindle. Surprisingly, however, a nap spindle can be used with one single tooth, because the single tooth due to the helical toothing wounds around the planetary spindle like a thread. The transport spindles are described in the patent applications EP10006066, DE1200633089, EP1844917.

A reduced speed of the central spindle can also contribute to the melt cooling in the cooling module/section according to the invention. For the reduced speed, less motor power is required. This means that less energy is supplied into the melt which must then be dissipated again by cooling. The usual speed of the central spindle amounts, depending on the construction size of the planetary roller extruder to:

| construction size | speed in r.p.m. |
|---|---|
| 70 mm | up to 220 |
| 100 mm | up to 220 |
| 120 mm | up to 220 |
| 150 mm | up to 115 |
| 180 mm | up to 80 |
| 200 mm | up to 80 |
| 250 mm | up to 80 |
| 300 mm | up to 80 |
| 400 mm | up to 80 |

According to the invention, the motor speed is reduced by at least 10%, preferably by at least 20%, even more preferably by at least 30% and most preferably by at least 40%.

At all measures according to the invention for reducing the energy input, the use of a melt pump or a side-arm extruder, but also an upstream single-screw can be an advantage. With the melt pump, the side-arm extruder and the upstream single-screw, a pressure can be generated in the cooling module/section, which, together with a low conveying effect of the planetary roller extruder parts in the cooing module, still ensures a sufficient melt transport in the cooling module/section, which still ensures a sufficient melt transport in the cooling module/section even without any significant conveying effect of the planetary roller extruder parts, which, with a conveying direction acting against the conveying effect of the planetary roller extruder parts (counteracting conveying effect), overcomes the conveying effect of this and secures a sufficient melt transport through the cooling module/section.

A counteracting conveying effect of the planetary roller extruder parts causes a stronger mixture of the melt. The counteracting conveying effect of the planetary roller extruder parts can be achieved at conventional supply of the melt at the drive end of the extruder when the conveying direction of the extruder is reversed. In the simplest case, a reversal of the direction of rotation may suffice.

At the same time, either the pump pressure is raised to such an extent that the planetary spindles fit at the previous slide rings, or the slide rings are arranged at lower pump pressure at the opposite end of the planetary spindles in the extruder so that the planetary spindles fit again at the slide rings under the pressure of the central spindles. Same applies in the case of using a side-arm extruder instead of a pump.

At counteracting conveying effect, the previous conveying direction of the planetary roller extruder will preferably be maintained so that the planetary roller extruder conveys further in the direction of its discharge end.

However, the pump is no longer arranged at the drive side, but at the opposite end of the extruder, preferably ahead of the discharge end. Cooled melt will no longer be discharged through the previous discharge end. In fact, the melt to be cooled is supplied through this end. To discharge the melt, an opening is then provided on the drive side in the planetary roller extruder housing. If the pump pressure is correspondingly high, the planetary spindles can then slide with the drive-side planetary spindle end on the slide rings arranged on the drive side. At a lower pump pressure, the planetary spindles can slide on the slide rings with the opposite end as before. When using a side-arm extruder instead of a pump, the previous discharge end of the extruder will be closed with a lid. Furthermore, the same conditions arise as when using a pump.

Different factors can influence the flow conditions in the extruder. These include in particular
- design of the planetary spindles;
- distance of the planetary spindles. The greater the distance, the stronger the influence of the pump. Preferably a distance of at least 1D, even more preferably of at least 2D is provided, with D being the outer diameter of the planetary spindles;
- pressure ratios.

The used pumps and side-arm extruders are preferably adjustable in speed. This allows a regulation of the melt fed. Preferably, a controllable valve, optionally also a pump is provided at the melt discharge. Especially with the pump at the extruder discharge, the filling degree of the extruder can be controlled.

The controlling also includes a speed variable drive for the planetary roller extruder and a measurement of the current consumption as well as a temperature measurement. The measurement preferably takes place at different places of the extruder. With the temperature measurement all factors of the cooling process can be optimized, for example, the drive speed for the planetary roller extruder/section/module, the melt supply, the melt discharge, the cooling temperature of the coolant.

The cooling module/section provides a particularly advantageous cooling, when the coolant between the liner and the surrounded housing is guided in channels, which run like threads on the liner surface and at the same time lead the coolant in axial direction of the liner.

According to the invention, liners are preferably used which show in the deepest depth between their teeth of the internal toothing and the coolant in dependence of the construction size of the extruder the following material thickness in millimeter (mm):

| construction size | material thickness | preferred material thickness |
| --- | --- | --- |
| 70 | less/equal 4.5 | less/equal 3 |
| 100 | less/equal 4.5 | less/equal 3 |
| 150 | less/equal 5 | less/equal 3.5 |
| 180 | less/equal 5.7 | less/equal 3.6 |
| 200 | less/equal 5.6 | less/equal 3.6 |
| 250 | less/equal 5.7 | less/equal 3.7 |
| 280 | less/equal 6 | less/equal 4 |
| 300 | less/equal 6 | less/equal 4 |
| 400 | less/equal 6.5 | less/equal 4.5 |

The pitch diameter of the internal toothing in the housing/liner is considered as the construction size. The above dimensions shall apply
- when the channels are incorporated in the inner wall of the housing,
- as well as if the channels are incorporated in the outer surface of the liner.

Then it depends on the smallest distance between the deepest depth between the teeth and the deepest depth of the channels.

Such thin liners are possible by applying a spark erosion technique at the manufacture of the internal teeth as described in DE102013000708, DE102012006169, DE102010026535, DE102009059912, DE102007050466, DE102004048440, DE10354172.

Preferably, the liners are outside provided with grooves. The liners, like the internal toothing, can be provided with the channel-forming grooves by spark erosion. However, if the groves are made before the internal toothing, the grooves can also be incorporated on a turning lathe or milling bench.

In the channel-forming grooves, the coolant flows from one end of the liner to the other end of the liner. The grooves run with a pitch to the liner center axis like the internal toothing. The pitch of the grooves can be the same as that of the internal toothing. However, the pitch can also be larger or smaller.

In the case of the channels incorporated into the outside surface of the liner, the thicknesses indicated above refer to the smallest material thickness, which is found between the deepest depth of the grooves/channels provided at the outside of the liners and the deepest depth between two teeth of the internal toothing of the liners.

With the outside grooved liners correspond housings with a smooth internal bore for supporting the liners. After assembly of the liners in the housing, the grooves are closed on the outside so that closed channels have been created. The assembly is preferably done by shrinking the housings on the liners.

The thin liners according to the invention have a great importance for the cooling. They shorten the heat flow so that the temperature can be controlled more rapidly and thus more precisely.

For the temperature control it is also favorable when a plurality of channels winds along the outer surface of the liners. This allows maintaining even temperature of the liners. The greater the heat quantity to be transported, the greater the temperature difference between the coolant and the extrusion material in the extruder is chosen. Furthermore, the cooling can be influenced by the flow speed of the coolant.

Preferably, the cooling between the liners and the surrounding housing is supplemented by a cooling of the central spindle. For this purpose, the central spindle preferably has two tubes arranged concentrically into each other between which there is an annular space. The outer tube is outside provided with a toothing or has one or more externally toothed sleeves, which together form the toothing of the central spindle. The inner tube is penetrated by an anchor with which the central spindle is clamped to the drive journal of the drive. The cooling of the central spindle is preferably effected with the same coolant as the cooling between the liner and the surrounding housing. The coolant can flow back through the inner tube to the central spindle tip and through the gap between the outer tube and the inner tube. Or the coolant can flow through the space between the outer tube and the inner tube to the central spindle tip and from there flow back again through the inner tube.

Moreover, it is advantageous, when using a screw for feeding the melt pump, to cool the screw as well. For this purpose, the screw can have, similarly to the central spindle, an outer and an inner tube flowed through by coolant and equipped with a drive.

As far as possible, water is preferably used as coolant. At higher temperatures, for which water is no longer suitable as tempering agent, oil is used. At low temperatures, preferably water is used to which an antifreeze such as, for example, glycol is added. At temperatures below zero degree Celsius, an oil such as silicone oil can also be used.

The re-cooling of the coolant depends on the temperature of the coolant leaving the extruder. At high temperatures, the re-cooling can take place by means of a heat exchanger through which ambient air flows. At low temperatures, the re-cooling takes place with an evaporator which is operated with high-tension gas.

According to the invention, any desired temperature profile over the length of the cooling section can be maintained by arranging successively several cooling circuits in extrusion direction of the planetary roller extruder over the length of the cooling section. For this purpose, the channels leading from one end of the cooling module/section to the other end of the cooling module/section can be subdivided into individual channel sections, and each channel section is assigned its own cooling device, so that the different channel sections can be charged differently with tempering agents. That means, it can be worked in each of the sections with another desired temperature. In the case of cooling with water, each channel section is equipped with its own water circuit. In the case of oil as coolant, each section has its own oil circuit. As a rule, cooling with water is sufficient because the initial temperature of the extrusion material is correspondingly high. However, if the extrusion material already has a temperature at which the cooling water temperature should be advantageously below zero degree Celsius in order to create a proper temperature gradient between extrusion material and cooling water, then the water may be charged with glycol or the like, to avoid freezing in the pipes. At even lower temperatures of the extrusion material, the use of silicone oil or the like may be appropriate.

The re-cooling of the cooling water, charged with glycol and heated in the cooling extruder takes place in a heat exchanger which is operated with high-tension gas, which is released in the heat exchanger.

The fabrication of a cooling module/section with a larger length is possible according to the invention, because the corresponding internal toothing can be produced by means of the spark erosion technique. The spark erosion technique for producing the internal toothing for overlong planetary roller extruder modules is described in WO2014/056553, WO2017/050400, EP1533101, EP2335898, DE433487.

With conventional technology, at which the internal toothing is drawn, the internal threads are getting worse with increasing length. With such a technology, only short planetary roller extruder sections/modules with sufficient quality can be produced in practice.

Anyhow, as described above, longer cooling sections can be produced from short planetary roller extruder modules/sections by interlocking several modules/sections. Thereby, the liners of the modules/sections can be aligned with their toothing in that way that an overlong planetary spindle can mesh simultaneously with the internal too thing of one liner and with the internal toothing of the other liner.

According to the invention is then used in that way that the internal toothing of the liners has a whole number of teeth (on the inner surface of the liner are circumferentially arranged whole teeth side by side, which run parallel to each other from one end of the liner to the other end of the liner). In order to produce a perfect contact of the planetary spindle with the internal toothing of the neighboring liners, the liners are brought to a certain distance, in which the planetary spindles simultaneously mesh in the toothing of the two liners. Starting from an always identical position of the liners in the module housings, the distance from the pitch of the teeth and their dimensions can be calculated.

The distance can be determined empirically, by, for example,
  first mounting the central spindle on the extruder drive,
  then mounting the first housing of the intended planetary roller extruder modules in extrusion direction,
  then pushing the next (second) housing in extrusion direction over the central spindle,
  then pushing a planetary spindle (better several planetary spindles, evenly distributed around the central spindle) between the central spindle and the second housing until the planetary spindle adjoins the liner of the second housing,
  then changing the distance of the housings by turning the planetary spindle until the planetary spindle engages with one tooth into the toothing of the liner of the first housing. The resulting distance of the liners can be used for the fabrication of an intermediate piece, by which the gap between the both spaced liners in axial direction is closed completely in the axial direction and at least partially in the radial direction. The distance between the liners determines the axial length of an intermediate piece between the two housings. The intermediate piece can surround the rotating planetary spindles without toothing. However, the intermediate piece can be internally toothed like the liners and bridge the gap between the two liners in such a way that a toothing length is created as at a one-piece liner, on which the two housings described above are shrunk,
  then securing the adjacent housings to each other at the flanges so that the intermediate piece is clamped between the neighboring ends of the housing.

It can also be an advantage to shrink two module housings on an overlong liner. This can be done with intermediate piece or without intermediate piece. The intermediate piece would then preferably have the task of protecting the liners in the gap between the shrunk-on housings from bending loads and other loads.

Although several planetary roller extruder modules arranged consecutively and aligned have separate housings and separate liners forming the internal toothing and as a rule separate planetary spindles, they always have a common central spindle. The common central spindle causes a common rotational movement of all moving parts.

By connecting several housings via an intermediate piece described above with a central spindle extending over all housings, the void of the planetary roller extruder can be increased in the axial direction by a multiple.

Instead of the axial enlargement of the void and/or in addition to the axial enlargement of the void, a radial enlargement of the void by axial enlargement can take place.

The radial enlargement comes into question as well for the new construction as for the conversion of an existing plant. The radial enlargement can easily be recognized at the conversion of an existing extruder/extrusion line. While the housings of all extruder sections usually all have the same diameter, a conversion according to the invention of the planetary roller extruder section/module results in a larger housing diameter.

At a new construction with an enlarged planetary roller extruder according to the invention arises usually a line with conventional other extruder sections having conventional housing sizes, so that even at new constructions the enlargement of the housing according to the invention is obvious.

Where no other conventional housing sizes provide the comparative benchmark, the radial enlargement according to the invention can be recognized in particular at the size ratios of the planetary spindles in the application of conventional tooth modules. The tooth modules determine the dimensions of the teeth at a toothing. This also applies to the here preferred involute helical toothing with a 45 degree inclination of the oblique course to the longitudinal axis of the toothed spindles.

Advantageously, the radial enlargement of the void according to the invention allows, during a conversion, to hold on to the central spindle which was previously provided in the extruder and extends through all the extruder sections/ modules. In the combination of planetary roller extruder sections/modules with a feed part in single-screw extruder design, the central spindle continues as a screw in the feed part. With the "continuation of the central spindle" is in the present case included that the central spindle is composed of sections, in which a corresponding screw section is dedicated to the feed part.

Also the previous assembly of the extruder and the upstream and downstream facilities can be maintained without being changed. Thus, a subsequent enlargement of the void is possible with little structural effort. Thereby, planetary spindles, greater in the diameter, with more teeth than at the previous planetary spindles are used, but the tooth module of the larger planetary spindles remains the same. The toothing module (also called tooth module) results in mm from the quotient of pitch diameter and number of teeth. The toothing module could be chosen freely. However, in order to obtain standardized tools for the toothing, the toothing modules are standardized according to DIN 780. The here mentioned toothing modules can be found in the following excerpt from DIN 780 with additional intermediate sizes: 1; 1.25; 1.5; 2; 2.5; 3; 3.5; 4; 5; 5.5; 6; 7; 8; 9; 10; 11; 12.

The housing surrounding the rotating planetary spindles also becomes larger in the adaptation of its internal toothing or the adaptation of the internal toothing of its liner to the rotating planetary spindles, but the tooth module remains the same.

As stated above, the dimensions of the toothings are determined by the pitch diameter and the tooth module. The pitch diameter of the internal toothing results from the pitch diameter of the external toothing of the central spindle and the double pitch diameter of the planetary spindles and the desired clearance in the toothing and, if necessary, from a correction factor.

The enlargement of the planetary spindles depends at a given toothing module on the fact that an integer number of teeth on the circumference of the planetary spindle as well as at the internal toothing of the housing or the housing of the liner occurs.

Besides the toothing module also the number of teeth is preferably specified for the enlargement of the planetary spindles.

Below please find the different construction sizes in conventional design (hereinafter called BG) or in heavy design (hereinafter called SBG) with standard toothing modules (hereinafter called SVM) for an involute helical gearing and standard number of teeth (hereinafter called SZZ) on the planetary spindles as well as a minimum number of teeth at an enlargement according to the invention (hereinafter called MVG), the preferred minimum number of teeth (hereinafter called BMVG), the further preferred minimum number of teeth (hereinafter called WBMVG) and the most preferred minimum number of teeth (hereinafter called HBMVG) of planetary spindles with enlargement according to the invention for the relevant construction size while retaining the standard tooth moduls.

|  | SVM | SZZ | MVG | BMVG | WMVG | HMVG |
|---|---|---|---|---|---|---|
| BG |  |  |  |  |  |  |
| 30 | 1 | 5 | 6 | 7 | 8 |  |
| 50 | 1.5 | 5 | 6 | 7 | 8 |  |
| 70 | 2.5 | 5 | 7 | 8 | 9 | 10 |
| 100 | 3 | 6 | 7 | 8 | 10 | 11 |

-continued

|  | SVM | SZZ | MVG | BMVG | WMVG | HMVG |
|---|---|---|---|---|---|---|
| 120 | 3 | 7 | 8 | 9 | 10 | 11 |
| 150 | 3 | 7 | 8 | 9 | 10 | 11 |
| 180 | 3; 3.5 | 7 | 8 | 10 | 12 | 14 |
| 200 | 3; 3.5 | 7 | 8 | 10 | 12 | 14 |
| 250 | 3; 3.5 | 7 | 8 | 10 | 12 | 14 |
| 280 | 3.5 | 7 | 8 | 10 | 12 | 15 |
| 300 | 3.5 | 7 | 8 | 10 | 13 | 16 |
| 350 | 3.5 | 7 | 8 | 10 | 13 | 16 |
| 400 | 3.5 | 7 | 8 | 10 | 13 | 17 |
| 450 |  | 7 | 8 | 10 | 14 | 18 |
| 500 |  | 7 | 8 | 10 | 14 | 18 |
| 650 |  | 7 | 8 | 10 | 15 | 20 |
| 800 |  | 7 | 8 | 10 | 15 | 20 |
| 1000 |  | 7 | 8 | 10 | 15 | 20 |
| 1200 |  | 7 | 8 | 10 | 16 | 22 |
| SBG |  |  |  |  |  |  |
| 150 | 5.5 | 7 | 8 | 10 |  |  |
| 200 | 5.5 | 7 | 8 | 10 |  |  |
| 280 | 5.5 | 7 | 8 | 10 |  |  |
| 300 | 5.5 | 7 | 8 | 10 |  |  |
| 400 | 5.5 | 7 | 8 | 10 |  |  |
| 500 | 5.5 | 7 | 8 | 10 |  |  |

The overview regarding planetary spindles with a standard number of teeth shows that the increase of the number of teeth to 8 is for all occurring construction sizes in the range according to the invention. Only at smaller sizes of 70 mm and 100 mm there is already an increase of the number of planetary teeth to 7 in the range of the invention. At even smaller construction sizes of 30 and 50 mm, there is even an increase of the number of planetary spindle teeth to 6 in the range of the invention.

The lower the toughness of the raw material, the easier is the exchange of extrusion material on the cooling surfaces. Another advantage of low toughness is the low mechanical load on the moving parts in the extruder section/module intended for cooling.

Preferably, the cooling section/module according to the invention is used when there is no longer any significant work of deformation must be performed in order to keep the substances to be cooled in a liquid or molten or flowable condition. Optionally, the work of deformation is also reduces by selecting a toothing module that is below the standard toothing module for planetary roller extruder sections/modules for the ranges where the melting of raw material takes place and/or a homogenization work or dispersion work is to be performed.

For example, instead of otherwise customary toothing modules of 5.5 and more, toothing modules of 3 or 3.5 can also be used in extruder sections/modules according to the invention.

As far as the original planetary spindles have a reduced number of teeth, the reduction in the number of teeth results from a removal of teeth on previously fully toothed planetary spindles or from another production of planetary spindles, which leads to a design like removing teeth from previously fully toothed planetary spindles.

For the calculation of the pitch diameter of the planetary spindles according to the invention it is to be emanated from the pitch diameter in full toothing—regardless of a later tooth reduction or other planetary spindle production that leads to the same result.

Advantageously, the invention also includes a radial enlargement of the extruder section/module intended for the cooling using an existing housing or an existing internally toothed liner. The existing housing and liner may be physically present or of a larger size from an existing construction size. As a precondition for using existing planetary roller extruder parts for a combination with a re-usable central spindle, the pitch diameter of the internal toothing of the liner or housing must be in a specific ratio to the central spindle and the planetary spindles, besides a compatible toothing module, besides taking into account the necessary clearance and correction factors.

In the light of the other conditions, the pitch diameter must be equal to the sum of pitch diameter of the central spindle and the double pitch diameter of the pitch diameter of the planetary spindles.

Preferably planetary spindles are used, which are larger than the planetary spindles belonging to the size of the selected housing and liner.

Thereby, even an existing, in principle too small central spindle can be used if an internally and externally toothed sleeve can be screwed on the centrals spindle being in principle too small and if the sleeve can correspond/mesh with its external toothing with the external toothing of the planetary spindles.

For this construction it is harmless whether and to what extent the tooth module on the central spindle deviates from the tooth module of internal toothing. The sleeve to be screwed onto the central spindle is manufactured with a thickness following the selection of the housing, liner and planetary spindles, which is adapted to the remaining gap between the central spindle continued to use and the planetary spindles.

Advantageously, the larger planetary spindles according to the invention result in a better revolution of the planetary spindles in the toothing of the central spindle and the internal toothing of the housing. This simplifies the construction. In addition, the speed of the planetary spindles is reduced in relation to the revolution around the central spindle.

The lower speed also reduces the energy input into the raw materials in the extruder. In addition, the lower speed causes a lower shear of the material. This is a great advantage for many plastics.

For the lower speed, a lower drive energy is required. Advantageously, this unloads the cooling of the extruder. The lower rotational speed also reduces the wear. In addition, the wear on the larger planetary spindles is distributed to more teeth. Both extend the service life of the planetary spindles.

The planetary spindles, larger in diameter, become more stable. This also makes the wear on the planetary spindles even more uniform, because the planetary spindles are less warped under uneven loading. This also reduces the risk of breakage due to a load, which is already caused by an overload on conventionally used planetary spindles.

The increased wear resistance of the planetary spindles is important for all extruders in which material with a high wear effect is processed. This is the case, for example, when processing scrap rubber in the planetary roller extruder for the purpose of devulcanization.

The housing diameter of the respective section/module is increased by the radial enlargement of a section/module. If an adjacent section/module remains unchanged, the result is a different diameter between the two housings. Anyhow, the housings can still be screwed on the commonly provided flanges, as long as the flanges have a sufficient overlap and correspondingly aligned screw holes can be placed into the flanges and
sufficient space for the screw heads and nuts is given.

If there are still larger planetary spindles and housings according to the invention, it may be of advantage to provide an adapter for connecting the clamping flanges of the larger housings with the clamping flanges of the adjacent extruder sections/modules. Preferably, the adapter has a ring shape and is inserted between the flanges. Moreover, the adapter has suitable connection surfaces for the relevant flanges. This means, if the relevant flange has a protrusion in its connection surface, the ring-shaped adapter has a matching recess on its connection surface. If the relevant flange has a recess at its connection surface, then the ring-shaped adapter has a matching protrusion on it connection surface. Preferably, the protrusion are cylindrical and the recesses of mirror image form. It's easy to make. The protrusions and recesses effect an advantageous centering of the extruder sections/modules.

Preferably, the protrusions are cylindrical and comprise the recesses, the cylindrical protrusions with a smaller clearance than required for a centering. The centering can be quite a few tenths of a millimeter in conventional extruders. Even more preferably, the clearance is less than or equal to 0.1 mm and most preferably less than or equal to 0.05 mm. The small clearance involves a more accurate fabrication.

Where the adapters intended between the flanges for reasons of manufacturing or other reasons due to their thickness cannot be mounted without further ado during refitting of an extrusion line with a section/module according to the invention into the existing gap between the flanges, the gap can be enlarged to a desired dimension in case of a new production of the housing and the planetary spindles.

However, if a gap width problem opens up because an existing larger housing of a common larger construction size shall be used, a ring-shaped adapter can also be screwed firstly to one of the corresponding clamping flanges, preferably to the smaller clamping flange on that side which is averted from the enlarged planetary roller extruder section/module according to the invention. Even more preferably, the adapter consists of various bow pieces which are screwed to the original mounting holes in the flanges. A desired centering can be depicted with an additional centering ring or
with ring intended for pressure and/or temperature sensors and/or
with a different ring construction, for example, with a molded ring for the melt transport which follows up the inlet side of the planetary roller extruder section/module according to the invention to the melt outlet opening of the adjacent extruder section and expands in transition to the melt inlet opening/inlet opening of the planetary roller extruder section/module according to the invention so that dead spaces will be avoided, in which the melt can stay uncontrolled.

As far as behind the radially enlarged extruder section/module also an extruder section with a housing, planetary spindles and central spindle of the same construction size is provided, a melt transport is advantageous, which tapers to the downstream section/module. As at the inlet of the radially enlarged section/module according to the invention, a ring can also be inserted at the outlet side for the melt transport. That means, the adapter alone or with other parts can perform various tasks, especially as centering ring, stop ring, retaining ring, ring for metering points.

It is also of advantage if the pitch diameter of the planetary spindles according to the invention is chosen in such a way that for the liner and the surrounding housing at least the same raw material as for another, larger, but still common construction size for planetary roller extruders can be selected. By using the same raw material, the stockpiling can be considerably simplified.

Regardless the question of using housings and liners of a different construction size, the housing resulting from the enlargement and the belonging liner are preferably likewise tubular (only with larger dimensions) as the housings of the adjacent planetary roller extruder sections/modules.

The tubular housing preferably also has outside arranged flanges for the connection with housings of adjacent extruder sections/modules.

The larger liner which is part of the larger housing is likewise equipped with the internal toothing and the outside integrated cooling channels. The larger housing/liner construction may also have similar recesses for a stop ring and, if necessary, in addition a ring construction as described in the PCT/EP2017/001372, however, with other dimensions.

As stated above, for the connection of a flange externally mounted on a larger housing according to the invention with the clamping flange of an adjacent smaller extruder section/module, an adapter, more preferably an annular adapter may be provided which is either screwed beforehand on the flange of the larger housing in order to be screwed afterwards on the smaller housing flange of the adjacent extruder section/module.

Or the adapter is previously screwed with the smaller housing flange of the adjacent extruder section/module in order to be subsequently screwed with the flange of the larger extruder section/module.

As an option, the outlet side adapter forms simultaneously
a thrust bearing for the stop ring on which the planetary spindles slide,
or even wholly or partly the stop ring
or a thrust bearing for a retaining ring
or wholly or partly the retaining ring
or a thrust bearing for a dispersion ring
or wholly or partly a dispersion ring
or wholly or partly a ring construction with additional tasks Optionally the inlet side adapter can form simultaneously
alone or together with the housing of the adjacent extruder section/module a seat and/or thrust bearing for another ring construction there
alone or together with other parts the other ring construction there.

At the enlargement of a section/module according to the invention it may be of advantage to form one of the rotating spindles in the planetary roller extruder section/module as a cleaner.

For this purpose, this planetary spindle is then composed of at least two planetary spindle sections whereat the one planetary spindle section engages at the butt joint with the other planetary spindle section with a journal in a boring of the other planetary section and in the deepest depth of the boring a disk spring is provided. The disk spring is designed in such a way that it brings the inlet-side planetary spindle section into a sliding contact with the opposite front wall. Thereby, this planetary spindle releases the exhaust openings in the front wall at each revolution. The disk springs give the planetary spindles that slide on both ends in the housing the possibility of adapting to an expansion and contraction of the construction.

A further task of the adapter can be die formation of a cooling surface/heating surface. Preferably, an at least two-part adapter is provided for this purpose, from the parts of which a channel for the temperature control (heating/cooling) is enclosed. The composition of several parts results in production advantages and cleaning advantages.

For the temperature control of the adapter the same is valid as for the temperature control of the housing.

At the tempering of the outlet-side adapter, a substantial part of the adapter volume can be planned for the course of the cooling channel. Optionally, multi-start channels can be used. Instead of two channels, more circular channels can be arranged concentrically. Instead of the circular arrangement, a spiral course of both adjoining channels may also be considered; and the like, a meandering course of both adjoining channels, in which the meandering does not take place in the usual form on a straight, but on a ring surface so that the two adjoining channels change their direction together from radially—in circumferential direction—in radial—in circumferential direction etc., until the channels in circumferential direction come back to the beginning.

The adapter can advantageously also have borings for measuring the melt temperature and/or the melt pressure. The borings are used to screw in sensing devices. The sensors can measure indirectly via an intermediate membrane. Preferably, a direct measurement is provided in which the sensors protrude directly into the medium to be measured.

It is convenient to make the measurements on the inlet side and outlet side.

For an exact heating-cooling, the already there indicated dimensions of the liners were of advantage. Due to the lower load on the extruder sections/modules with radial enlargement according to the invention, the material thicknesses on the liner in the deepest depth between the lands extending in radial direction at construction sizes from 70 to 280 mm can be reduced by at least 25% compared to the specified limits, at construction sizes up to 180 mm even by at least 40%

Nevertheless, the liners remain due to the lands of the toothing extending in radial direction and in circumferential direction and due to the lands extending in radial direction and in circumferential direction between the channels intended for the temperature control still sufficiently strong.

Several planetary roller extruder modules, arranged one behind the other, not aligned, in extrusion direction, have separate central spindles. Such an arrangement occurs at so-called tandem systems with primary extruder and secondary extruder or cascade system in case in extrusion direction further extruders, not aligned, are intended behind the secondary extruder. The cooling module/section can be used as well in aligned planetary roller extruder sections/modules as well as in the sections/modules of a tandem system/cascade system; likewise in a single arrangement.

DETAILED DESCRIPTION

Figure 1:
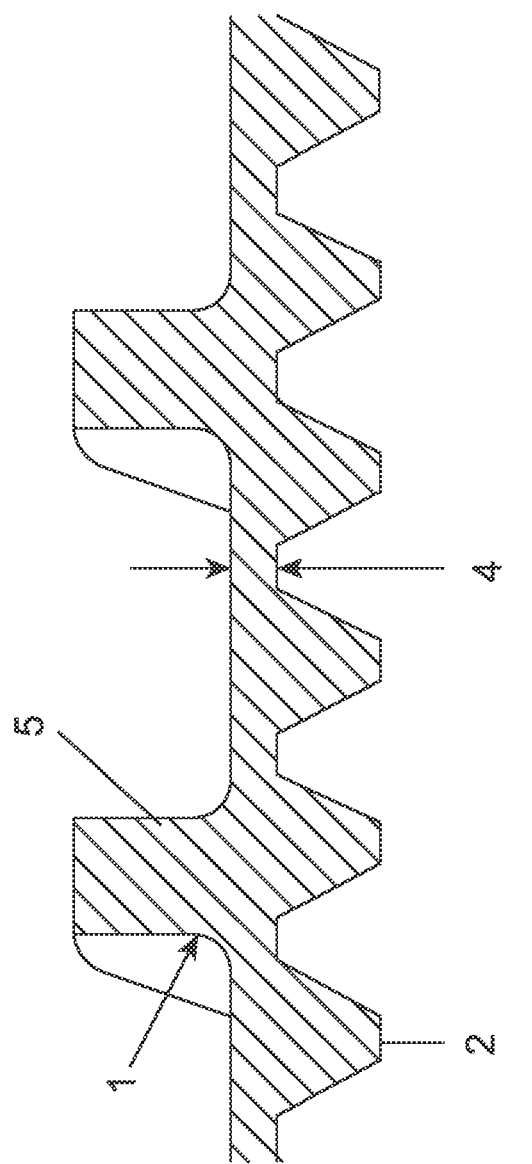
FIG. 1 shows a section of a liner for a planetary roller extruder.

FIG. 1 shows a section of a portion of a liner 1 for a planetary roller extruder section/module intended for cooling. On the inside, the toothing 2 can be seen; on the outside the turn-out/cut-out, which form the channels 3. The dimension in the deepest depth between the teeth and the deepest depth of the channels is denoted by reference numeral 4.

Figure 2:
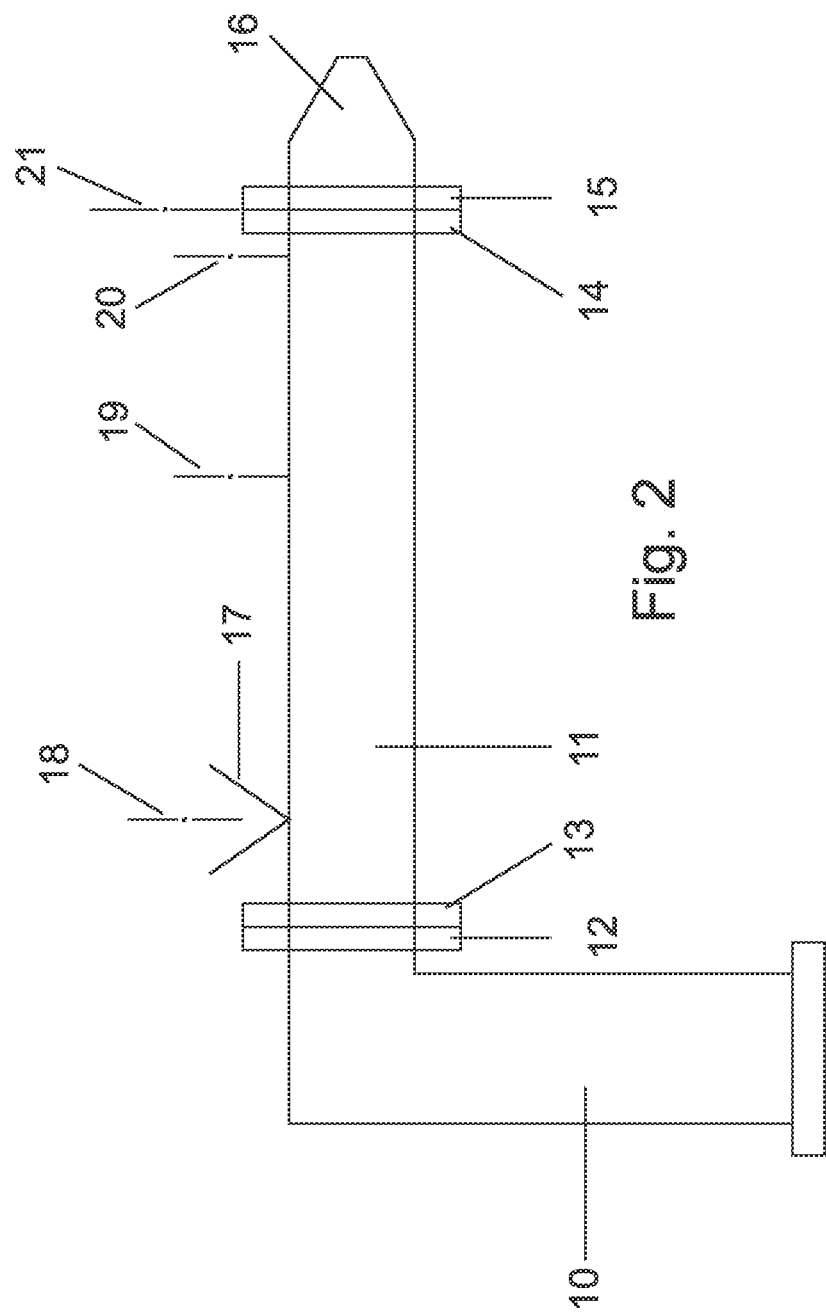
FIG. 2 shows an extruder with a planetary roller extruder section.

FIG. 2 shows an extruder with a planetary roller extruder section 11, designed as a planetary roller extruder, a drive 10 and an outlet 16. The length of the section 11 corresponds to the desired length of the cooling section.

The housing of the section 11 is equipped at both ends with flanges 13 and 14. With one flange 13 it is secured to a flange 12 of the drive and with an opposite flange 14 it is secured with a flange 15 of the outlet 16.

The section 11 has in the housing a non-depicted internally toothed liner, a non-depicted central spindle, which is set in rotation by the drive.

In the execution example, there are four planetary spindles rotating around the central spindle. The planetary spindles are distributed evenly around the circumference of the central spindle and mesh with both the outer toothing of the central spindle and the internal toothing of the liner.

In the execution example, the extruder has the task of cooling. In this case, melt is supplied in the extruder via a pump 18 and a feed line 17. At the point 19, cooled to exit temperature melt is withdrawn via a pump 20 and fed into the subsequent die 21. For connection of the die with the extruder 12, flanges 42 and 43 are provided at the die 15 and the housing of the extruder.

Figure 3:
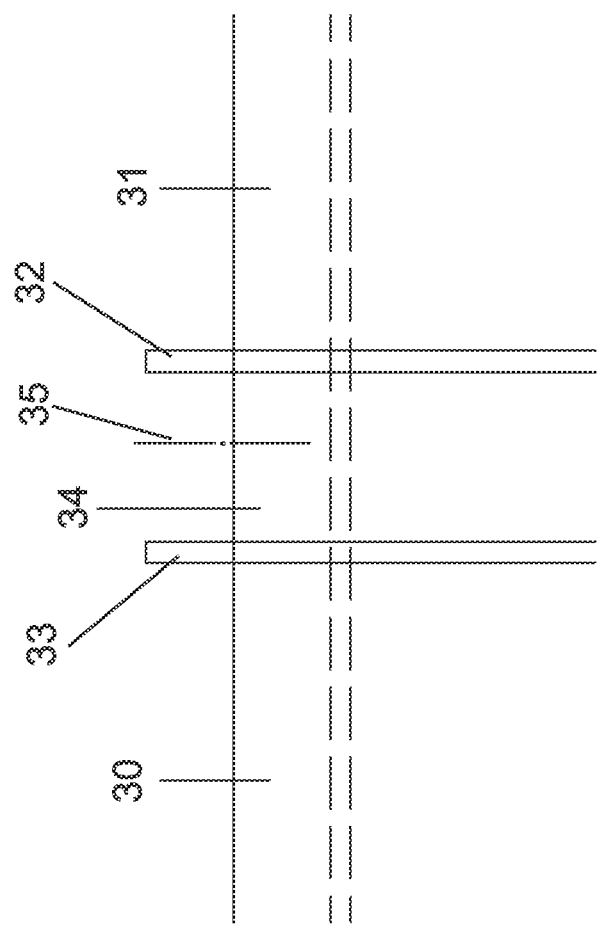
FIG. 3 shows an example of a cooling section formed by two planetary roller extruder modules.

FIG. 3 shows an execution example, at which the cooling section is formed by two planetary roller extruder modules 30 and 31, the housings of which are secured together to the flanges 32 and 33 and thereby clamp a spacer piece 34. The housings 30 and 31 are equipped with a liner which is internally toothed and which corresponds with the planetary spindles and the central spindle of the planetary roller extruder modules respectively. The toothing of both liners is the same.

Moreover, the spacer piece 34 is equipped with the same toothing and dimensioned and arranged in such a way that overlong spindles pass through both modules.

In a further execution example, at the spacer piece 34 there is intended a metering point at 35.

Figure 4:
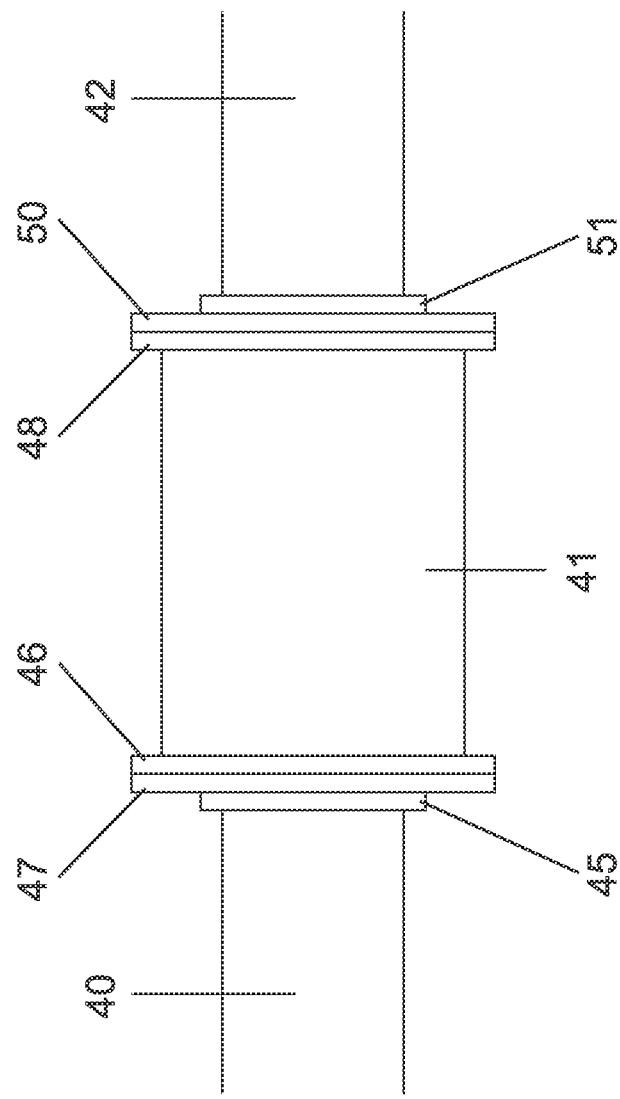
FIG. 4 shows an extruder line with three planetary roller extruder modules.

FIG. 4 shows an extruder line with three planetary roller extruder modules 40, 41 and 42 arranged one behind the other. Of these modules, the planetary roller extruder modules 40 and 42 are of the same construction size. Module 41 is radially enlarged compared to the other modules.

A common central spindle extends through all modules 40, 41 and 42.

The modules 40 and 42 have planetary spindles with the same pitch diameter and mesh with their external toothing with the external toothing of the central spindle, whereas the spindles of the module 41 have a larger pitch diameter. But also these planetary spindles are meshing with the common central spindle. This is possible, because the tooth module of the toothing of the central spindle is the same as the tooth module of the planetary spindles of all planetary roller extruder modules 40, 41 and 42. The number of teeth of the planetary spindles in the planetary roller extruder module 41 is, however, larger than that of the planetary spindles in the other planetary roller extruder modules 40 and 42. This causes a larger pitch diameter of the planetary spindles in the planetary roller extruder module 41.

Moreover, all planetary spindles mesh with their toothing with the internal toothing of a liner which is located in the corresponding housing. This is possible, because also the internal toothings were manufactured with the same tooth module like the central spindle and the planetary spindles. However, the pitch diameter of the internal toothing in the planetary roller extruder 41 is, due to the larger pitch diameter of the planetary spindles, essentially larger than the pitch diameter of the internal toothing in the other planetary roller extruder modules 40 and 42.

The housings of all planetary roller extruder modules are screwed together with flanges.

The radially enlarged planetary roller extruder module 41 has a tubular housing with flanges 46 and 48 at both ends.

The inlet-side flange 46 is screwed via an adapter ring 47 with a flange 45 of the upstream planetary roller extruder module 40. Thereby, different screw connections are intended: one screw connection between the flange 45 and the adapter ring 47 and one screw connection of the adapter ring 47 with the flange 46. In the execution example, the screw connection consists of 6 screws, in other execution examples, more screws are provided.

In the execution example, the adapter ring 47 simultaneously effects a centering of the extruder parts connected to each other. Thereto, the adapter ring 47 engages with a protrusion into a recess of the flange 45, while the flange 46 engages with a protrusion into a recess of adapter ring 47.

The outlet-side flange 48 is screwed via an adapter ring 50 with the flange 51 of an adjacent extruder section/module. Here are also provided several screws as on the above explained screwing. In addition, the adapter ring 50 causes a centering of the interconnected extruder sections/modules. The adapter ring 50 engages with a protrusion in a recess of the flange 48, while the flange 51 engages with a protrusion in a recess of the adapter ring 50.

Figure 6:
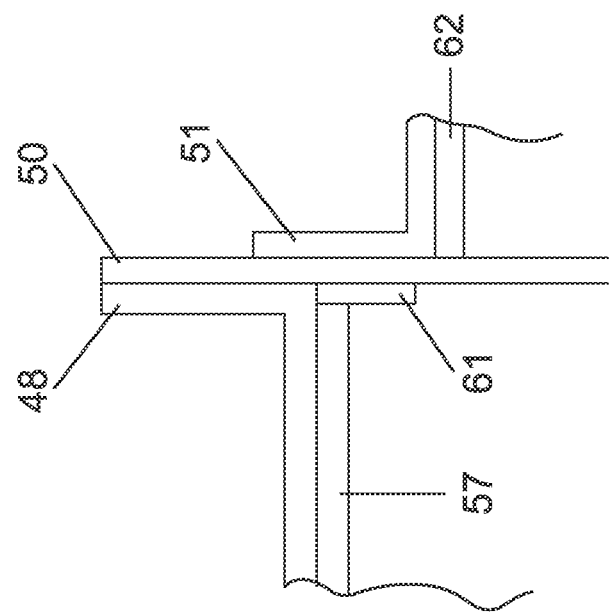
FIG. 6 depicts an alternative connection of different planetary roller extruder sections/modules.
Figure 5:
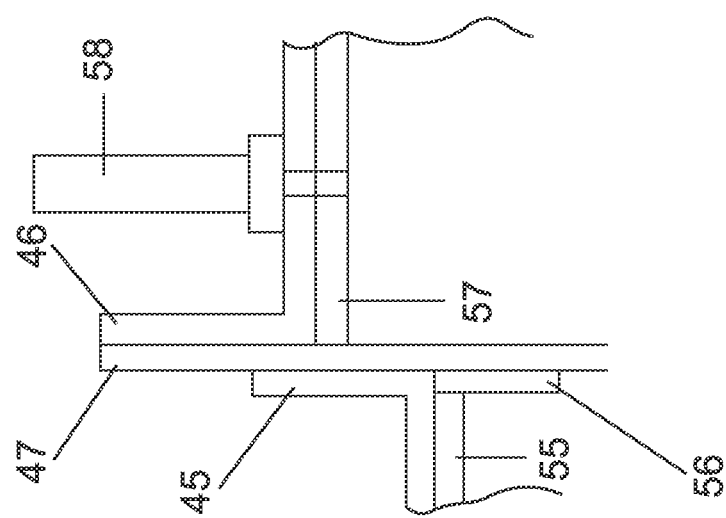
FIG. 5 depicts a connection of different planetary roller extruder sections/modules.

In FIGS. 5 and 6, the situation at the connection point of the different planetary roller extruder sections/modules is depicted in an enlargement and in an extract. Here, the internally toothed housing liner 55 of the section/module 40, the housing liner 57 of the section/module 41 is, and the housing liner 62 of the section/module 42 are shown.

At the same time, the stop ring 56 for the section/module 40 and the stop ring 61 for the section/module 41 are shown. At the stop ring 56 slide planetary spindles which are rotating in the section/module 40. At the stop ring 57 slide the planetary spindles which rotate in the section/module 41.

The intermediate ring 47 forms also a thrust bearing for the stop ring 56, the intermediate ring 50 forms also a thrust bearing for the stop ring 61.

FIG. 5 shows also the application of a side-arm extruder 58 for a metering point in the section/module 41.

In FIGS. 5 and 6, the arrangement of the stop rings 56 and 61 points out that the extrusion direction proceeds in the view from left to right.

In other execution examples, the cooling section/module according to the invention is arranged between extruder sections/modules of another type of construction than that of a planetary roller extruder.

Figure 8:
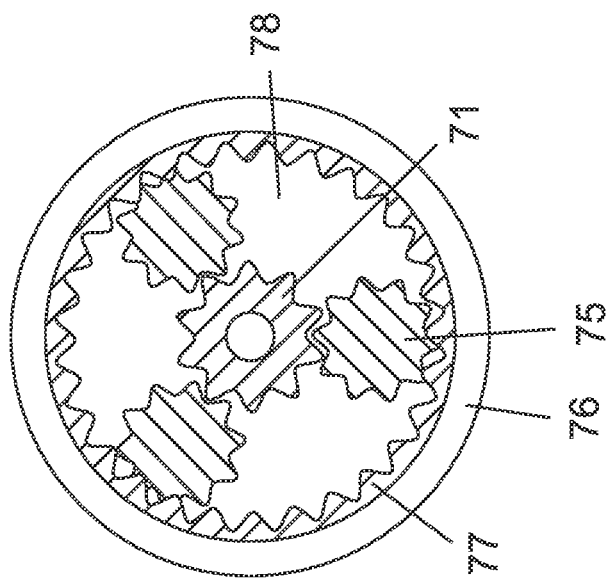
FIG. 8 depicts a radial enlargement of the planetary roller extruder/module cross section.
Figure 7:
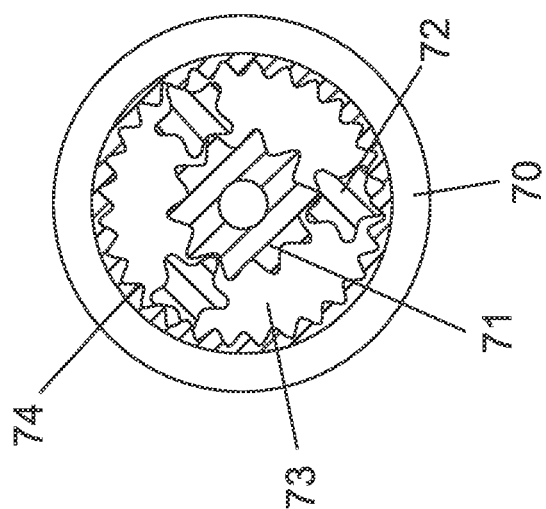
FIG. 7 shows a planetary roller extruder depicted in a cross section.

FIGS. 7 and 8 show the enlargement of void at the radial enlargement according to the invention.

Thereby is in FIG. 7 a planetary roller extruder depicted in a cross section. Shown are a central spindle 71, three planetary spindles 72, a surrounding, cylindrical housing 70 and an internally toothed liner 74. In the void of the internally toothed liner 74, the central spindle 71 and the planetary spindles 72 leave open voids 73. The planetary spindles 72 bear each 5 teeth on their circumference. In the execution example, this results in a cross section of the void (crosswise to the longitudinal direction of the extruder) with an area of 2583 square millimeters.

In FIG. 8, a radial enlargement of the planetary roller extruder/module cross section is depicted. The central spindle 71 is therein included in its original form. The planetary spindles 75, however, have at the same toothing module in difference to the planetary spindles 72 nine teeth 75 with corresponding larger pitch diameter.

The housing 76 and the internally toothed liner 77 are adapted by a corresponding enlargement to this configuration.

The void 78 is evidently about twice as large as the void 73 as per FIG. 7. In the execution example this results at comparable void cross section in an area of 4960 square millimeter.

Planetary roller extruder/module cross sections may be identical with the cross sections according to FIGS. 7 and 8 except for the number of the planetary spindles. Four instead of the three planetary spindles 72 and 75 shown in FIGS. 7 and 8 may be used. This creates a cross-sectional area of 2314 square millimeters or respectively a cross-sectional area of 4204 square millimeters.

Planetary roller extruder/module-cross sections may be identical with the cross sections according to FIGS. 7 and 8 except for the number of planetary spindles. Five instead of the three planetary spindles 72 and 75 shown in FIGS. 7 and 8 may be used. This creates a cross sectional area of 2104 square millimeters or respectively a cross sectional area of 3500 square millimeters.

Figure 9:
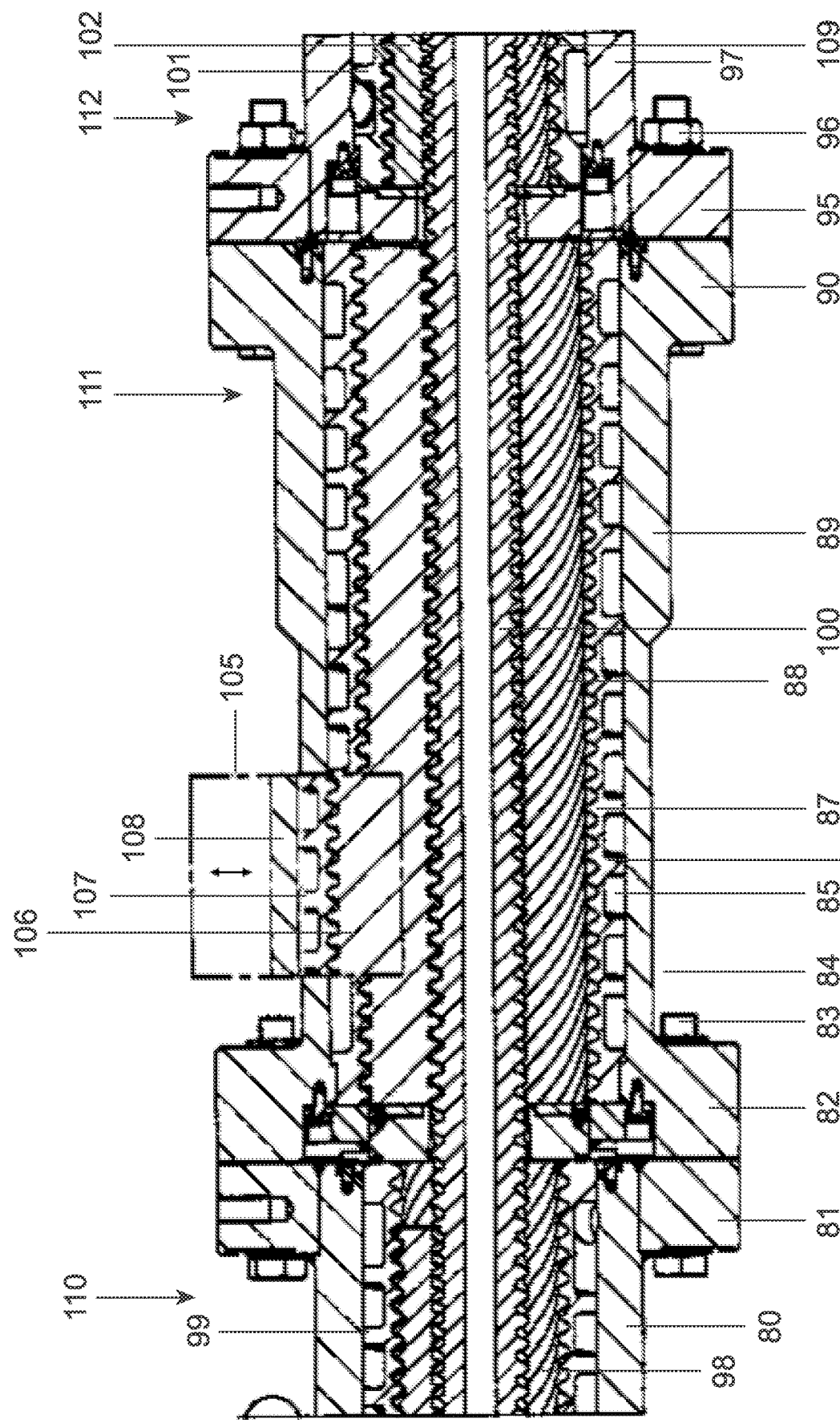
FIG. 9 shows a longitudinal section through three planetary roller extruder sections/modules.

FIG. 9 shows a longitudinal section through three planetary roller extruder sections/modules, of which the sections/modules 110 and 112 include the section 111 between them. All three sections have a common central spindle 100.

To section 110 belongs a housing 80 with an internally toothed liner 99. The liner 99 is outside equipped with cooling channels through which water flows as a heating-cooling agent during operation. The liner is inside equipped with a toothing. The liner 99 encloses three planetary spindles 98. The planetary spindles 98 mesh with their external toothing with the internal toothing of the liner 99. Moreover, the planetary spindles 98 mesh with their toothing with the toothing of the central spindle 100. Regarding the features, the section 110 corresponds to the depiction according to FIG. 7.

To section 111 belongs a housing 97 with an internally toothed liner 101. Outside, the liner 97 has the same cooling channels and cooling like the section 110. The liner 97 encloses three planetary spindles 102. The planetary spindles 102 mesh with the surrounding internal toothing and the central spindle 100. In this respect there is an accord with the section 110.

To section 111 belongs a housing 89 with a liner 86. Outside, the liner 86 has cooling channels 85, inside a toothing 87. The liner 86 encloses three planetary spindles 88, which on their part enclose the central spindle 100. Thereby, the planetary spindles 88 mesh with the internal toothing 87 and the external toothing of the central spindle.

In contrast to the planetary spindles 98 and 109, however, the planetary spindles 88 of section 111 have more teeth and at the same tooth module a significantly larger pitch diameter. The internal toothing 87 is adjusted to the liner 86 so that the housing 89 is correspondingly larger. The housing 86 is screwed at one end with the housing 80 of the section 110 and at the other end with the housing 97. For the screwing, there are intended flanges 81 and 82 at the one end and at the other end flanges 90 and 95. The belonging screws are labeled 83 and 96.

The tube shell of the housing 89 has in the area 84 in adaptation to the lower load of the housing in a cooling operation a taper.

FIG. 9 shows at the same time dot-dashed a window 105, in which it can be seen which dimensions the housing 108, has, when planetary spindles 106 are used, which cause a further radial enlargement due to an even greater number of teeth. The resulting housing liner is labeled 107.

Figure 10:
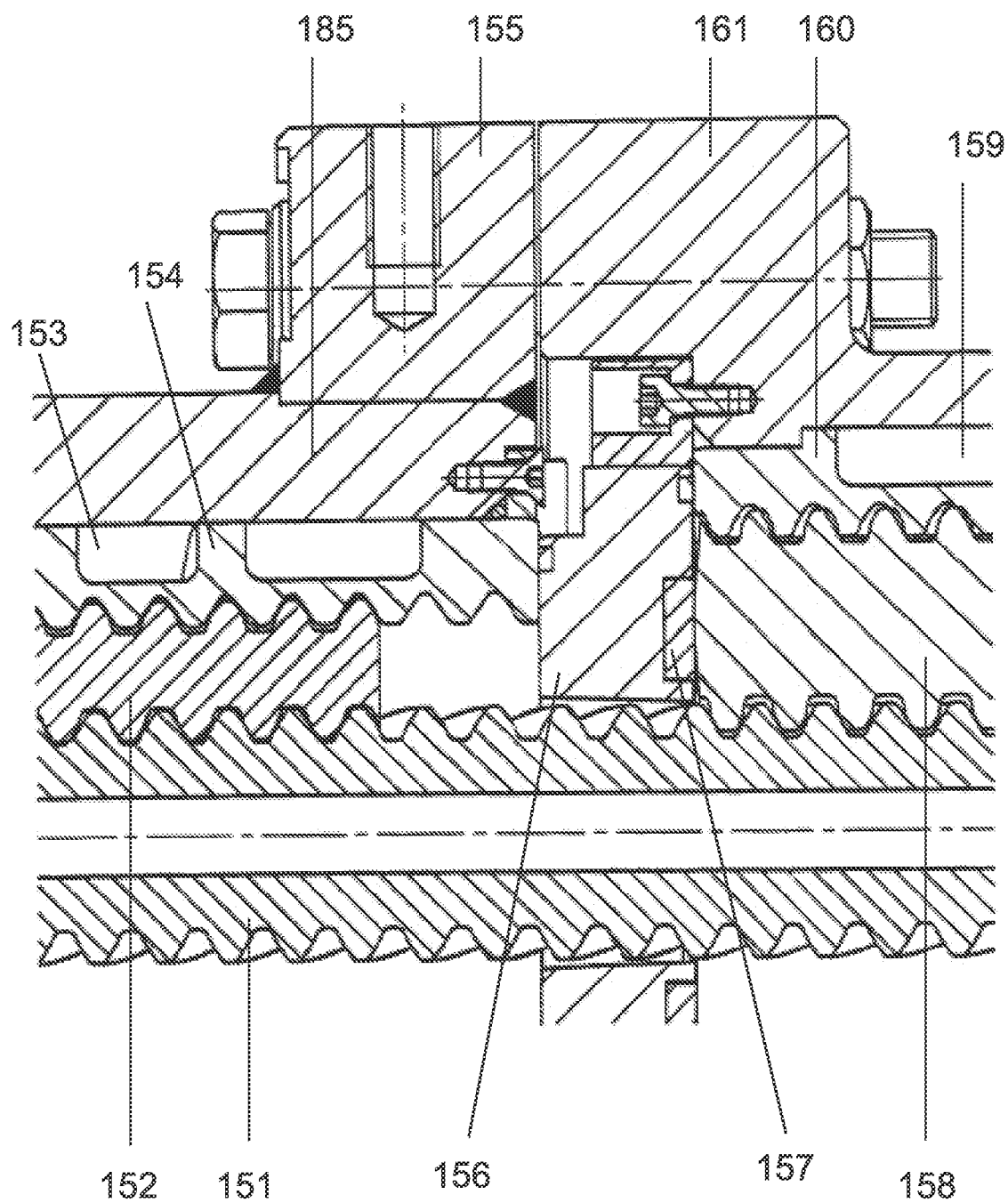
FIG. 10 is a cross section showing a connection of different planetary roller extruder sections/modules.
Figure 11:
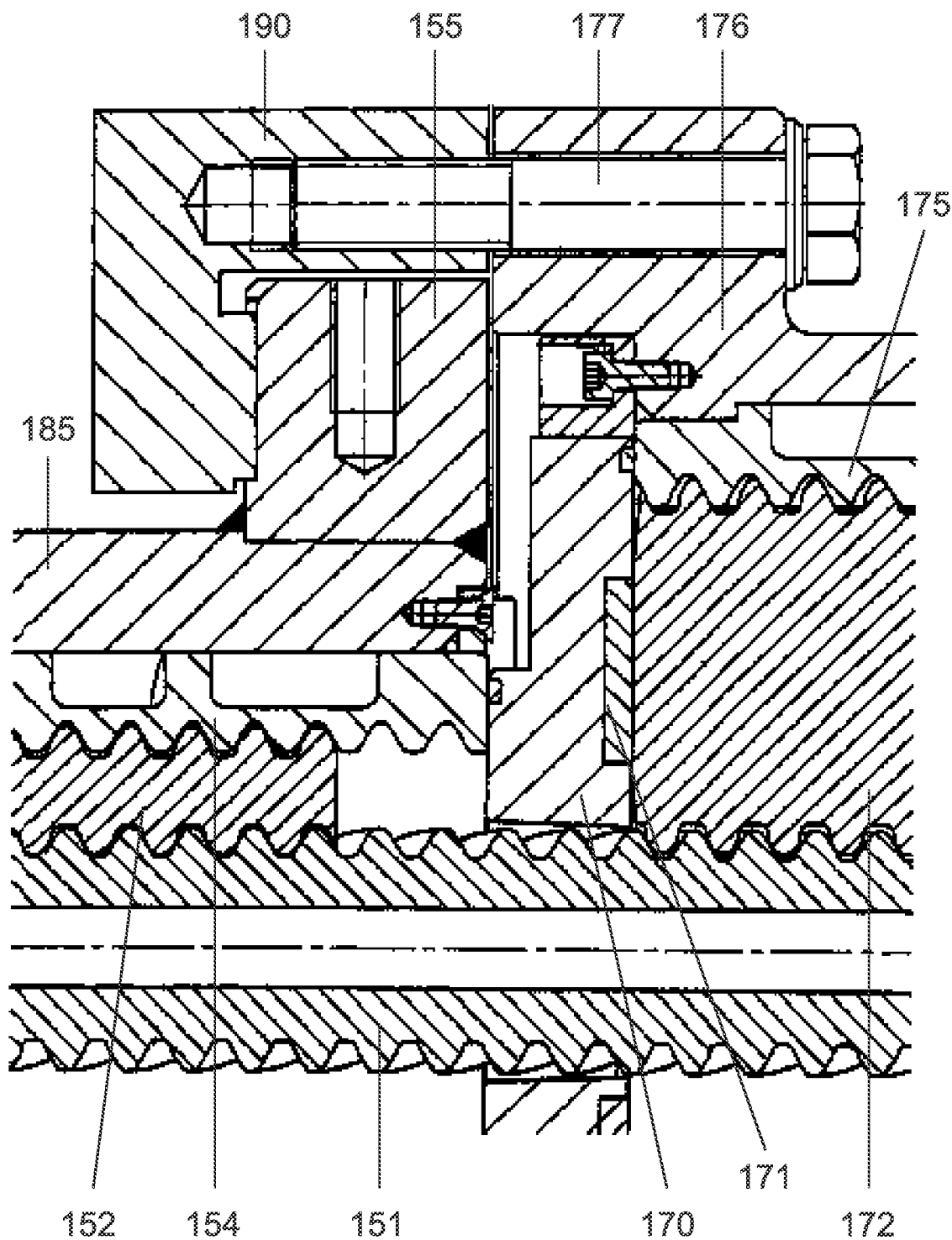
FIG. 11 is a cross section showing an alternative connection of different planetary roller extruder sections/modules.

FIGS. 10 and 11 show variants of the construction depicted in the FIGS. 5 and 6. In contrast to the FIGS. 5 and 6, the extrusion direction proceeds from right to left in the views according to FIGS. 10 and 11. This becomes clear from the position of the stop ring 156. The stop ring 156 belongs to a radially enlarged cooling module in planetary roller extruder construction, from which a plastic mass with all components for the production of a pressure-sensitive adhesive with the exception of a cross-linking agent is transferred to a conventional planetary roller extruder module, which has the task to mix-in cross-linking agents and to temper the mass to extrusion temperature.

Between the stop ring 156 and the central spindle there is only a small gap. Thereby, the stop ring 156 forms a retaining ring. The melt backs up in front of the stop ring and forms a natural sealing.

As in FIGS. 4 and 5 is also according to FIGS. 10 and 11 another planetary roller extruder module is arranged upstream to the radially enlarged cooling section/module. This upstream planetary roller extruder module has like all other planetary roller extruders a stop ring. Also this stop ring is, like stop ring 156, formed as retaining ring so that the melt backs up in front of this ring and forms as well a natural sealing.

Moreover, in the execution example, a sealing is provided between the flanges of the housings or between the flanges and the adapter.

The radially enlarged cooling section/module has a much larger void volume than the downstream conventional planetary roller extruder module. The larger void volume offers better cooling conditions than a conventional planetary roller extruder module.

The radially enlarged cooling module has a housing with a liner 160 which is equipped outside with channels 159 for the heating-cooling of the plastic mass and inside with the same toothing as the central spindle 151, but with another pitch diameter. The pitch diameter roughly corresponds to the sum from the pitch diameter of the central spindle 151 and twice the diameter of the planetary spindles 158. Rough means that a necessary clearance in the toothing is taken into account so that the planetary spindles can mesh on the one hand with the central spindle 151 and on the other hand with the liner 160. During operation the planetary spindles 158 rotate in the liner 160 around the central spindle 158. Thereby, the planetary spindles 158 slide on a stop ring 156. For reduction of the wear, the stop ring 156 is equipped with a hard metal insert.

The conventional planetary roller extruder module has planetary spindles 152 of about half the pitch diameter as the planetary spindles 158. The associated liner 154 is located in a housing 185 and has cooling channels 153. The housing 185 is composed of a tube and a welded collar 155.

The housing 161 of the radially enlarged cooling sector/module is screwed to the collar 155. For this purpose, corresponding through borings are provided in the collar 155 and the housing 161, which are permeated by screws so that the screws protrude vis-à-vis at the housing 161 and are secured with screw nuts.

The stop ring 156 encloses the central spindle 151 in a distance at which the plastic mass out of the cooling sector/module can flow into the downstream planetary roller module.

FIG. 11 shows a cooling section/module in the design of a planetary roller extruder, which even further radially enlarged than the cooling section/module according to FIG. 10. The cooling section/module also has rotating planetary spindles 172, a housing 176, and a liner 175, a stop ring 170 with a hard metal insert 171.

The planetary roller extruder module downstream of the section/module is the same as in FIG. 10. All parts of the downstream planetary roller extruder module have the same marking as in FIG. 10. The further enlarged section/module has even better cooling conditions.

Due to the further enlargement of the section/module, another connection of the section/module with the downstream planetary roller extruder is provided. In fact, in the execution example according to FIG. 11 is also a screwing provided for the connection. For this purpose, there are corresponding through borings in the housing 176. The connection with the collar 155 takes place, according to FIG. 11, via an adapter 190. The adapter 190 is a ring with an inside collar. With the inside collar, the adapter 190 engages in a grove of the collar 155, which centers the adapter and ensures also an alignment of both housings 176 and 185.

The invention claimed is:

1. An extruder, comprising:
    a planetary roller extruder section or planetary roller extruder module for cooling melts, comprising
        an internally toothed liner,
        an externally toothed central spindle disposed centrally within and at a distance from the internally toothed liner,
        planetary spindles disposed between the central spindle and the internally toothed liner, each planetary spindle having an external toothing meshing with both the internally toothed liner and the externally toothed rotating central spindle, and
        a stop ring configured to axially support a rear end of the planetary spindles while the planetary spindles rotate around the central spindle,
    a die arranged at an outlet of the extruder;
    a choke arranged upstream of the die at an outlet of the planetary roller extruder section or planetary roller extruder module,
        wherein the planetary roller extruder section or planetary roller extruder module for cooling melts is arranged immediately upstream of the die and configured to reduce a temperature of melt from a processing temperature to a discharge temperature, and
        wherein a distance between centerlines of adjacent planetary spindles is at least 1.5 times an outer diameter of the planetary spindles; least equal to an outer diameter of the planetary spindles;
    a pressurized melt supply;
    at least one section/module having a flow, during melt supply, converse to the conveying direction of the extruder; and
    cooling tubes arranged within the central spindle.

2. The extruder according to claim 1,
    wherein the choke is an adjustable valve, and
    wherein the choke is configured to throttle a flow of the melt at the outlet and adapted to maintain a filling level of the planetary roller extruder section or planetary roller extruder module for cooling melts that is greater than 95%.

3. The extruder according to claim 1,
    wherein the pressurized melt supply is arranged at an inlet side of the planetary roller extruder section or planetary roller extruder module for cooling melts, and
    wherein the pressurized melt supply comprising one or more of a side-arm extruder, a melt pump, and a single-screw module.

4. The extruder according to claim 3, wherein a conveying pressure of the melt pump or the side-arm extruder or the single-screw module is larger than a conveying pressure of the planetary roller extruder section or planetary roller extruder module.

5. The extruder according to claim 3,
    wherein the pressurized melt supply is arranged proximal to a drive of the planetary roller extruder section or planetary roller extruder module,
    wherein a conveying direction of the planetary roller extruder section or module is directed against the pressurized melt supply, and
    wherein a discharge of cooled melt is provided at an extruder end which faces away from the drive.

6. The extruder according to claim 3,
    wherein the pressurized melt supply is provided at an extruder end which faces away from a drive,
    wherein a conveying direction of the planetary roller extruder section or module is directed against the pressurized melt supply, and
    wherein a discharge of cooled melt is provided an end of the extruder proximal to the drive.

7. The extruder according to claim 3, wherein the pressurized melt supply is a side-arm extruder or a melt pump and arranged at a ring preceding a housing of the planetary roller extruder module or section which surrounds the central spindle.

8. The extruder according to claim 3, wherein the melt pump or the side-arm extruder is located on an extruder end facing away from a drive.

9. The extruder according to claim 1, wherein the distance between the centerlines of the adjacent planetary spindles is at most equal to twice the outer diameter of the planetary spindles.

10. The extruder according to claim 1,
    wherein a coolant is guided in helical channels between the internally toothed liner and a surrounding housing, and
    wherein a minimal wall thickness of the internally toothed liner, in dependence on a pitch diameter of the internal toothing of the internally toothed liner, amounts to:

| construction size [mm] | minimal material thickness [mm] |
|---|---|
| 70 | less/equal 4.5 |
| 100 | less/equal 4.5 |
| 150 | less/equal 5 |

-continued

| construction size [mm] | minimal material thickness [mm] |
|---|---|
| 180 | less/equal 5.7 |
| 200 | less/equal 5.6 |
| 250 | less/equal 5.7 |
| 280 | less/equal 6 |
| 300 | less/equal 6 |
| 400 | less/equal 6.5. |

11. The extruder according to claim 1, wherein a maximum speed of the central spindle, in dependence on a pitch diameter of the internal toothing of the internally toothed liner, does not exceed the following values:

| construction size [mm] | maximum speed in r.p.m. |
|---|---|
| 70 | 198 |
| 100 | 198 |
| 120 | 198 |
| 150 | 103 |
| 180 | 72 |
| 200 | 72 |
| 250 | 72 |
| 300 | 72 |
| 400 | 72. |

12. The extruder according to claim 1, wherein the planetary spindles include one or more nap spindles and/or transport spindles.

13. The extruder according to claim 1, wherein a long cooling section is formed by
the planetary roller extruder section or planetary roller extruder module for cooling melts being connected to
a further planetary roller extruder section/module, wherein the planetary spindles extend through both the planetary roller extruder section or planetary roller extruder module and the further planetary roller extruder section/module.

14. The extruder according to claim 1,
further comprising a second planetary roller extruder section or planetary roller extruder module,
wherein a void between the central spindle and the internally toothed liner of the planetary roller extruder section or planetary roller extruder module is radially larger than a void between a central spindle and a liner of the second planetary roller extruder section or planetary roller extruder module.

15. The extruder according to claim 14,
wherein a diameter of the central spindle in the planetary roller extruder section or planetary roller extruder module and a diameter of the central spindle in the second planetary roller extruder section or planetary roller extruder module are the same,
wherein a diameter of the planetary spindles in the planetary roller extruder section or planetary roller extruder module is larger than a diameter of the planetary spindles in the second planetary roller extruder section or planetary roller extruder module,
wherein a diameter of the internally toothed liner in the planetary roller extruder section or planetary roller extruder module is larger than a diameter of the liner in the second planetary roller extruder section or planetary roller extruder module, and
wherein a number of teeth of the planetary spindles and the internally toothed liner in the planetary roller extruder section or planetary roller extruder module is larger than a number of teeth of the planetary spindles and the liner in the second planetary roller extruder section or planetary roller extruder module.

16. The extruder according to claim 15, wherein the planetary spindles for central spindles of a construction size of at least 120 mm have 8 or more teeth.

17. The extruder according to claim 15, wherein the planetary spindles for central spindles of a construction size of at the most 100 mm have 7 or more teeth.

18. The extruder according to claim 15, wherein the planetary spindles for central spindles of a construction size of at the most 70 mm have 6 or more teeth.

19. The extruder according to claim 14,
wherein the planetary spindles of the first planetary roller extruder section or planetary roller extruder module mesh directly with
the central spindle of the second planetary roller extruder section or planetary roller extruder module or with
an internally and externally toothed sleeve, which is screwed onto the central spindle.

20. The extruder according to claim 14,
wherein a diameter of the central spindle in the planetary roller extruder section or planetary roller extruder module and a diameter of the central spindle in the second planetary roller extruder section or planetary roller extruder module are the same,
wherein a housing and the internally toothed liner of the planetary roller extruder section or planetary roller extruder module with another toothing module are used,
wherein the planetary spindles of the planetary roller extruder section or planetary roller extruder module are radially enlarged relative to the planetary spindles of the second planetary roller extruder section or planetary roller extruder module while maintaining the toothing module of the internally toothed liner,
wherein an internally and externally toothed sleeve is screwed on the central spindle, and
wherein the planetary spindles are meshing with the external toothing of the screwed-on sleeve.

21. The extruder according to claim 14, wherein the central spindle and/or the planetary spindles and/or the internally toothed liner are chosen out of the following construction series:

| | SVM |
|---|---|
| BG | |
| 30 | 1 |
| 50 | 1.5 |
| 70 | 2.5 |
| 100 | 3 |
| 120 | 3 |
| 150 | 3 |
| 180 | 3; 3.5 |
| 200 | 3; 3.5 |
| 250 | 3; 3.5 |
| 280 | 3.5 |
| 300 | 3.5 |
| 350 | 3.5 |
| 400 | 3.5 |
| SBG | |
| 150 | 5.5 |
| 200 | 5.5 |
| 280 | 5.5 |
| 300 | 5.5 |

-continued

|  | SVM |
|---|---|
| 400 | 5.5 |
| 500 | 5.5 |
| 150 | 5.5 |
| 200 | 5.5 | wherein BG refers to construction sizes in standard design and SBG refers to construction sizes in heavy design are marked, construction size being a pitch diameter of the internal toothing of the internally toothed liner;

and wherein SVM refers to a toothing module.

22. The extruder according to claim 14, wherein an inlet opening and/or an outlet opening are formed by a ring.

23. The extruder according to claim 14, wherein an adapter is arranged between the planetary roller extruder section or planetary roller extruder module and the second planetary roller extruder section or planetary roller extruder module.

24. The extruder according to claim 23, wherein the adapter alone or with other parts at the same time forms a stop ring and/or a retaining ring and/or a ring for metering points and/or a centering and/or is tempered.

* * * * *